United States Patent
Gong et al.

(10) Patent No.: US 11,249,764 B2
(45) Date of Patent: Feb. 15, 2022

(54) FLUSHING IN A MICROPROCESSOR WITH MULTI-STEP AHEAD BRANCH PREDICTOR AND A FETCH TARGET QUEUE

(71) Applicant: Shanghai Zhaoxin Semiconductor Co., Ltd., Shanghai (CN)

(72) Inventors: Fangong Gong, Beijing (CN); Mengchen Yang, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/069,204

(22) Filed: Oct. 13, 2020

(65) Prior Publication Data
US 2021/0318881 A1    Oct. 14, 2021

(30) Foreign Application Priority Data

Apr. 14, 2020  (CN) .......................... 202010289061.X
Sep. 23, 2020  (CN) .......................... 202011011051.6

(51) Int. Cl.
G06F 9/38   (2018.01)
G06F 9/30   (2018.01)
G06F 9/32   (2018.01)
G06F 12/0875 (2016.01)

(52) U.S. Cl.
CPC ........ *G06F 9/3848* (2013.01); *G06F 9/30047* (2013.01); *G06F 9/321* (2013.01); *G06F 9/3806* (2013.01); *G06F 9/3808* (2013.01); *G06F 9/3822* (2013.01); *G06F 9/3861* (2013.01); *G06F 9/3885* (2013.01); *G06F 12/0875* (2013.01); *G06F 2212/452* (2013.01)

(58) Field of Classification Search
CPC ............................. G06F 9/3806; G06F 9/3861
See application file for complete search history.

(56) References Cited

U.S. PATENT DOCUMENTS

2019/0155608 A1* 5/2019 Perais .................. G06F 9/3806

OTHER PUBLICATIONS

Perais et al, Elastic Instruction Fetching, 2019, IEEE, 2378-203X/19, pp. 478-490 (Year: 2019).*

* cited by examiner

*Primary Examiner* — Shawn Doman
(74) *Attorney, Agent, or Firm* — McClure, Qualey & Rodack, LLP

(57) ABSTRACT

A microprocessor is shown, in which a branch predictor and an instruction cache are decoupled by a fetch-target queue (FTQ). The FTQ stores at least an instruction address whose branch prediction has been finished by the branch predictor. The instruction addresses queued in the FTQ is to be read out later as an instruction-fetching address for the instruction cache. The instruction address that is input into the branch predictor and used for branch prediction leads the instruction-fetching address.

15 Claims, 15 Drawing Sheets

| | Condition to be satisfied | | AddrBP |
|---|---|---|---|
| WrPtr0 | afterbr | No additional Conditions | PC |
| | ~afterbr | no branch to be taken in a chuck indicated by PC | PC+16 |
| WrPtr1 | afterbr | there is a branch to be taken in the chunk indicated by PC and the taken branch is called by a branch instruction across two adjacent chunks | PC+16 |
| | ~afterbr | no branch to be taken in a chuck indicated by PC+16 | PC+32 |
| | afterbr | there is a branch to be taken in the chunk indicated by PC+16 and the taken branch is called by a branch instruction across two adjacent chunks | PC+32 |
| | | no branch to be taken in the two chucks indicated by PC and PC+16 | |
| WrPtr2 | afterbr | there is no branch to be taken in a chuck indicated by PC, but there is a branch to be taken in the chunk indicated by PC+16 and the taken branch is called by a branch instruction across two adjacent chunks | PC+48 |
| | ~afterbr | there is no branch to be taken in a chuck indicated by PC+16, but there is a branch to be taken in the chunk indicated by PC+32 and the taken branch is called by a branch instruction across two adjacent chunks | PC+48 |
| WrPtr3 | afterbr | there is no branch to be taken in the two chucks indicated by PC and PC+16, but there is a branch to be taken in the chunk indicated by PC+32 and the taken branch is called by a branch instruction across two adjacent chunks | |

| | Condition to be satisfied | | AddrBP |
|---|---|---|---|
| WrPtr0 | afterbr | No additional Conditions | PC |
| | ~afterbr | | PC+32 |
| WrPtr1 | afterbr | no branch to be taken in a chuck indicated by PC | PC+16 |
| | ~afterbr | there is a branch to be taken in the chunk indicated by PC and the taken branch is called by a branch instruction across two adjacent chunks | PC+16 |
| | | there is a branch to be taken in the chunk indicated by PC+32 and the taken branch is called by a branch instruction across two adjacent chunks | PC+48 |
| WrPtr2 | afterbr | no branch to be taken in the two chucks indicated by PC and PC+16 | PC+32 |
| | | there is no branch to be taken in a chuck indicated by PC, but there is a branch to be taken in the chunk indicated by PC+16 and the taken branch is called by a branch instruction across two adjacent chunks | |
| WrPtr3 | afterbr | there is no branch to be taken in the two chucks indicated by PC and PC+16, but there is a branch to be taken in the chunk indicated by PC+32 and the taken branch is called by a branch instruction across two adjacent chunks | PC+48 |

| | Condition to be satisfied | AddrBP |
|---|---|---|
| WrPtr0 | No additional Conditions | PC |
| WrPtr1 | no branch to be taken in a chuck indicated by PC there is a branch to be taken in the chunk indicated by PC and the taken branch is called by a branch instruction across two adjacent chunks | PC+16 |
| WrPtr2 | no branch to be taken in the two chucks indicated by PC and PC+16 there is no branch to be taken in a chuck indicated by PC, but there is a branch to be taken in the chunk indicated by PC+16 and the taken branch is called by a branch instruction across two adjacent chunks | PC+32 |
| WrPtr3 | there is no branch to be taken in the two chucks indicated by PC and PC+16, but there is a branch to be taken in the chunk indicated by PC+32 and the taken branch is called by a branch instruction across two adjacent chunks | PC+48 |

FLUSHING IN A MICROPROCESSOR WITH MULTI-STEP AHEAD BRANCH PREDICTOR AND A FETCH TARGET QUEUE

CROSS REFERENCE TO RELATED APPLICATIONS

This application claims the benefit of China Patent Applications No. 202010289061.X filed on Apr. 14, 2020 and No. 202011011051.6 filed on Sep. 23, 2020, the entirety of which are incorporated by reference herein.

BACKGROUND OF THE INVENTION

Field of the Invention

The present invention relates to instruction fetching of a microprocessor.

Description of the Related Art

In computer architecture, a branch predictor is generally a digital circuit that predicts whether a branch instruction (e.g., a conditional branch instruction 'if-then-else', a call instruction 'call', a return instruction 'return', and an unconditional branch instruction 'jump') exists and how the predicted branch is performed. The branch predictor effectively accelerates the instruction fetching of the microprocessor, and significantly improves the performance of a pipelined microprocessor.

In existing branch prediction technology, the branch predictor is tied to the instruction-fetching address operating the instruction cache (L1i). Branch prediction and instruction fetching are performed at the same speed. A delay in the branch predictor may delay the instruction fetching, and vice versa. How to improve the branch prediction technology is an important issue in this technical field.

Furthermore, instruction fetching may fail. A solution for instruction fetching failure is called for.

BRIEF SUMMARY OF THE INVENTION

In the present invention, a branch predictor of a microprocessor is decoupled from an instruction cache of the microprocessor. In some situations, the instruction address that is input into the branch predictor and used for branch prediction is ahead of the instruction-fetching address that is input into the instruction cache. The branch prediction, therefore, may be much ahead of the instruction fetching without being delayed by the instruction-fetching operation. Furthermore, an asynchronous mode is introduced when the pipeline of the microprocessor needs to be flushed. In the asynchronous mode, the instruction fetching is not dependent on the prediction result of the branch prediction. The instruction fetching is not tied to the prediction result of the branch prediction until the prediction result is in time. In this manner, the instruction fetching is not affected by the prediction delay.

A microprocessor in accordance with an exemplary embodiment of the present invention has a fetch-target queue (FTQ) coupled between a branch predictor and an instruction cache. From the branch predictor, the fetch-target queue receives and stores at least one instruction address with finished branch prediction, to be read out later as the instruction-fetching address for the instruction cache. An instruction address is input into the branch predictor and used for branch prediction, and this instruction address leads the instruction-fetching address.

In an exemplary embodiment, during the same cycle, the branch predictor performs branch prediction in parallel for a plurality of instruction addresses. Instruction addresses pushed into the fetch-target queue by the branch predictor in the current cycle do not overlap previously-predicted instruction addresses which have been pushed into the fetch-target queue in a previous cycle.

In an exemplary embodiment, the microprocessor further has a decoder and an execution unit. The decoder receives and decodes an instruction fetched from the instruction cache according to the instruction-fetching address. The execution unit is coupled to the decoder to execute the decoded instruction. When the decoder or the execution unit triggers a flushing event, a flushing address is fed to the instruction cache as the instruction-fetching address and the fetch-target queue is cleared. When the decoder or the execution unit triggers the flushing event, the branch predictor may be also switched to perform branch prediction for the flushing address. Prediction-purpose self-increased addresses incremented from the flushing address may be generated cycle by cycle and processed by the branch predictor for branch prediction. Fetching-purpose self-increased addresses incremented from the flushing address are generated cycle by cycle to be fed to the instruction cache as the instruction-fetching address. When any of the instruction addresses pushed into the fetch-target queue is equal to a fetching-purpose self-increased address generated in the same cycle, the instruction cache is switched to receive the instruction-fetching address from the fetch-target queue.

In an exemplary embodiment, the branch predictor involves multiple stages of pipeline operations, and the instruction cache may also involve multiple stages of pipeline operations parallel to the multiple pipeline stages of the branch predictor. The branch predictor performs branch prediction for a plurality of instruction addresses in parallel. In an exemplary embodiment, the fetch-target queue is operated according to a starting write pointer and a read pointer. In response to the flushing address fed to the instruction cache, the starting write pointer and the read pointer are both reset to point to a starting entry of the fetch-target queue. The read pointer moves to the next entry each cycle. In response to instruction addresses pushed into the fetch-target queue in the current cycle, the starting write pointer is revised to point to a first entry that is allocated to store a first instruction address among the instruction addresses pushed into the fetch-target queue in the current cycle. Instruction addresses are pushed into the fetch-target queue in parallel by the branch predictor and indicated by parallel write pointers, and the parallel write pointers include the starting write pointer and self-increased write pointers incremented from the starting write pointer. When the read pointer is equal to any of the parallel write pointers, the instruction cache is switched to receive the instruction-fetching address from the fetch-target queue.

In an exemplary embodiment, when the read pointer is equal to any of the parallel write pointers in the first cycle, the instruction cache is switched to receive the instruction-fetching address from the fetch-target queue in the second cycle next to the first cycle. In an exemplary embodiment, the microprocessor further has a multiplexer. The multiplexer receives the instruction addresses that read out from the fetch-target queue, the fetching-purpose self-increased addresses, and the flushing address, to provide the instruction cache with the instruction-fetching address.

In an exemplary embodiment, the branch predictor involves multiple stages of pipeline operations, and the instruction cache may also involve multiple stages of pipeline operations parallel to the multiple pipeline stages of the branch predictor. The branch predictor performs branch prediction for a plurality of instruction addresses in parallel. When the branch predictor predicts that a branch will be taken and predicts the branch target address of the taken branch, instruction addresses with finished branch prediction but bypassed by the taken branch are not pushed into the fetch-target queue. In response to the predicted branch target address, the branch predictor is switched to perform branch prediction for the branch target address. Prediction-purpose self-increased addresses incremented from the branch target address are further generated cycle by cycle and processed by the branch predictor for branch prediction. When no instruction address is read out from the fetch-target queue, the branch target address is fed to the instruction cache as the instruction-fetching address. Fetching-purpose self-increased addresses incremented from the branch target address are further generated cycle by cycle to be fed to the instruction cache as the instruction-fetching address. When any of the instruction addresses pushed into the fetch-target queue is equal to a fetching-purpose self-increased address generated in the same cycle, the instruction cache is switched to receive the instruction-fetching address from the fetch-target queue.

In an exemplary embodiment, the fetch-target queue is operated according to a starting write pointer and a read pointer. In response to instruction addresses pushed into the fetch-target queue in the current cycle, the starting write pointer is revised to point to a first entry that is allocated to store a first instruction address among the instruction addresses pushed into the fetch-target queue in the current cycle. When the branch target address is predicted, the starting write pointer and the read pointer are both corrected to point to a first blank entry. The read pointer moves to the next entry each cycle. Instruction addresses are pushed into the fetch-target queue in parallel by the branch predictor and indicated by parallel write pointers, and the parallel write pointers include the starting write pointer and self-increased write pointers incremented from the starting write pointer. When the read pointer is equal to any of the parallel write pointers, the instruction cache is switched to receive the instruction-fetching address from the fetch-target queue.

In an exemplary embodiment, when the read pointer is equal to any of the parallel write pointers in the first cycle, the instruction cache is switched to receive the instruction-fetching address from the fetch-target queue in the second cycle next to the first cycle. In an exemplary embodiment, the microprocessor further has a multiplexer. The multiplexer receives the instruction addresses that read out from the fetch-target queue, the fetching-purpose self-increased addresses, and the branch target address, to provide the instruction cache with the instruction-fetching address.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIGS. 4A, 4B, and 4C illustrate how to fill in the instruction address AddrBP of each entry of the fetch-target queue FTQ in accordance with an exemplary embodiment of the present invention;

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

Figure 1:
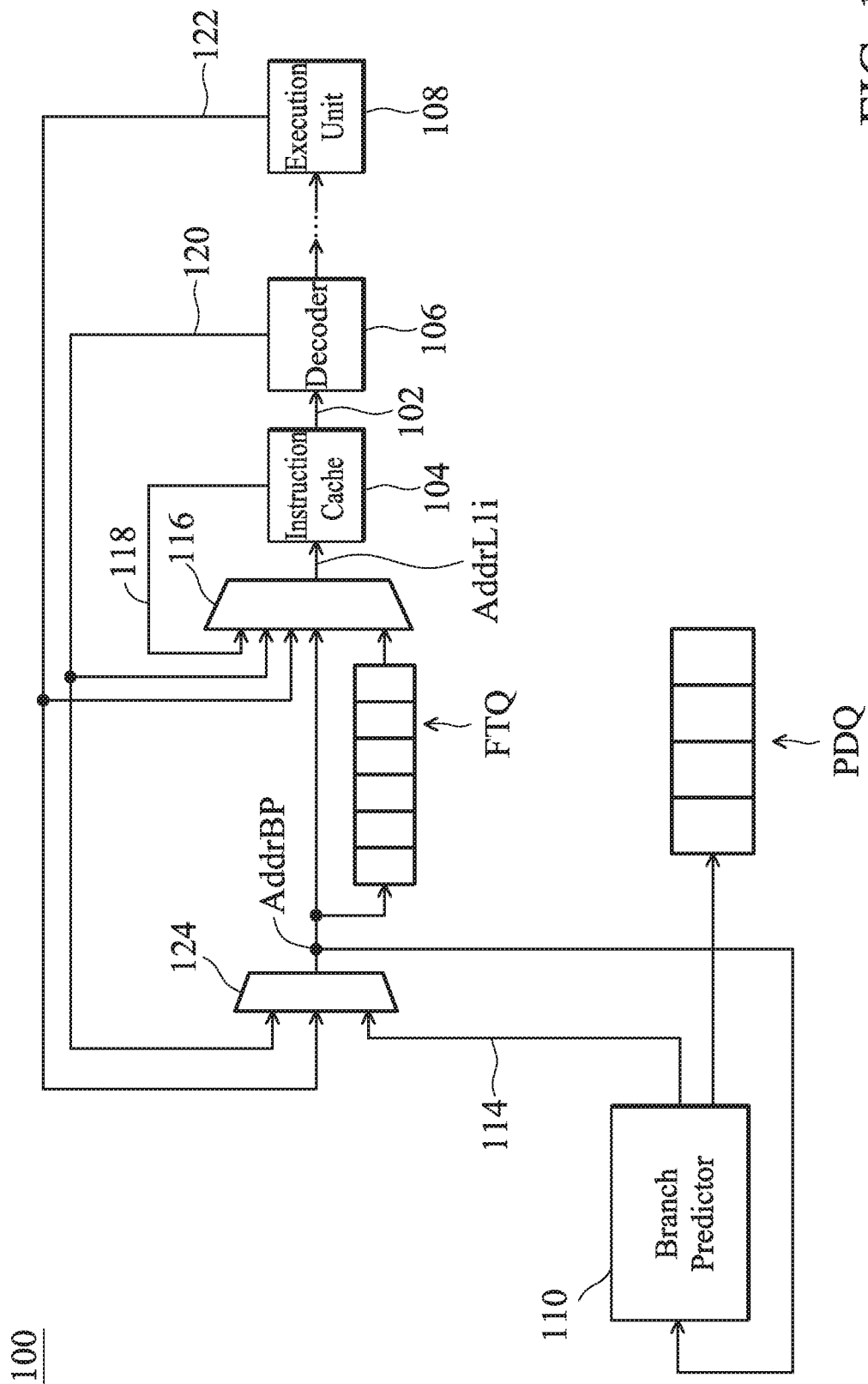
FIG. 1 depicts a microprocessor 100 in accordance with an exemplary embodiment of the present invention.

FIG. 1 depicts a microprocessor 100 in accordance with an exemplary embodiment of the present invention.

According to an instruction-fetching address AddrL1i, an instruction 102 is fetched from an instruction cache (e.g., L1i) 104, decoded by a decoder 106, and finally executed by an execution unit 108. Each chunk fetched according to one instruction address may be 16 bytes. That is, 16 bytes of instructions are fetched together. In the traditional technology, the instruction-fetching address AddrL1i for fetching the instruction cache 104 is also sent to a branch predictor. The instruction fetching and branch prediction are performed in parallel in the conventional design. The microprocessor 100 of the present invention, however, decouples the branch predictor 110 and the instruction cache 104. The branch predictor 110 performs branch prediction for an instruction address AddrBP, which may be highly ahead of the instruction-fetching instruction AddrL1i sent to the instruction cache 104.

Referring to FIG. 1, the microprocessor 100 has a fetch-target queue FTQ coupled between the branch predictor 110 and the instruction cache 104. From the branch predictor 110, instruction addresses with finished branch prediction are pushed into the fetch-target queue FTQ to be output later as the instruction-fetching address AddrL1i for the instruction cache 104. Because of the fetch-target queue FTQ, the instruction address AddrBP input the branch predictor 110 for branch prediction can lead the instruction-fetching address AddrL1i. In detail, instruction addresses from the branch predictor 110 with finished branch prediction may be all or partially pushed into the fetch-target queue FTQ, and then output from the fetch-target queue FTQ one by one as the instruction-fetching address AddrL1i for accessing the cached instructions from the instruction cache 104. The fetch-target queue FTQ decouples the branch predictor 110 from the instruction cache 104. The branch predictor 110 does not need to synchronize with the instruction cache 104. Instead of performing branch prediction for the instruction-fetching address AddrL1i of the instruction cache 104, the branch predictor 110 performs branch prediction for an instruction address AddrBP that is independent from the instruction-fetching address AddrL1i. In this manner, the branch predictor 110 may significantly lead the instruction fetching on the instruction cache 104.

By using the fetch-target queue FTQ to decouple the branch predictor 110 from the instruction cache 104, the efficiency of branch prediction and instruction fetching of a microprocessor is significantly improved. Due to the early branch prediction performed by the branch predictor 110, the meaningless (not in the predicted direction) instruction addresses AddrBP are not pushed into the fetch-target queue FTQ and so that the meaningless instruction fetching is not performed. Only the meaningful addresses (in the predicted direction) are pushed into the fetch-target queue FTQ as the guide for instruction fetching and, accordingly, instructions are smoothly fetched from the instruction cache 104.

This paragraph describes the signal flow when a branch is predicted. As shown, an instruction address AddrBP is incremented cycle by cycle and is fed to the branch predictor 110 every cycle for branch prediction. When a branch is predicted, a branch target address 114 of the predicted branch is applied to update the instruction address AddrBP, so that the branch predictor 110 is switched to perform branch prediction on the chunks starting from the branch target address. If the fetch-target queue FTQ happens to be empty, the instruction address AddrBP updated by the branch target address 114 may be directly passed to the instruction cache 104 as the instruction-fetching address AddrL1i, wherein the fetch-target queue FTQ is bypassed. The multiplexer 116 includes a path for the direct transfer of the instruction address AddrBP updated by the branch target address 114. The instruction cache 104 generates fetching-purpose self-increased addresses 118 (increased from the branch target address 114) cycle by cycle to be transferred to the multiplexer 116 and output by the multiplexer 116 as the instruction-fetching address AddrL1i. When the content queued in the fetch-target queue FTQ catches up with the instruction fetching of the instruction cache 104, the instruction cache 104 may be switched back to receive the instruction address output from the fetch-target queue FTQ as the instruction-fetching address AddrL1i. For example, the instruction cache 104 may be switched back to receive the instruction-fetching address AddrL1i from the fetch-target queue FTQ when the generated fetching-purpose self-increased address 118 can be also found in the fetch-target queue FTQ (e.g., the generated fetching-purpose self-increased address 118 is equal to one instruction address currently pushed into the fetch-target queue FTQ).

In another aspect, along the pipeline of the microprocessor 100, a request to flush the instruction-fetching address AddrL1i may happen. For example, the branch predictor 110 may be inaccurate, so that the instruction fetching guide queued in the fetch-target queue FTQ may be wrong, the decoder 106 or the execution unit 108 operated in the later pipeline stages of the microprocessor 100 may recognize the wrong guide and request to flush the instruction-fetching address AddrL1i. In another example, an exception that happens in the running of the decoder 106 or the execution unit 108 may also result in a need for flushing. In response to the flushing request, the decoder 106 (or the execution unit 108) may return a flushing address 120 (or 122), to be transferred through the multiplexer 116 to update the instruction-fetching address AddrL1i. The fetch-target queue FTQ may be cleared in response to the flushing event. In later cycles, the instruction cache 104 generates fetching-purpose self-increased addresses 118 (increased from the flushing address 120 or 122 cycle by cycle) to be transferred to the multiplexer 116 and output by the multiplexer 116 as the instruction-fetching address AddrL1i. In addition, the flushing address 120/122 is also coupled to the multiplexer 124 to be output as the instruction address AddrBP transferred to the branch predictor 110. Accordingly, the branch predictor 110 is switched to perform branch prediction starting from the flushing address 120/122, and is no longer wasted on branch prediction along the wrong trajectory.

When a flushing event happens during the pipeline calculations of the microprocessor 100, the instruction-fetching address AddrL1i for accessing the cached instructions from the instruction cache 104 is updated by the flushing address 120/122 and then further updated by the fetching-purpose self-increased addresses 118 (increased from the flushing address 120/122 cycle by cycle). In this manner, although the fetch-target queue FTQ is cleared by the flushing event, the instruction cache 104 is not stalled by the empty status of the fetch-target queue FTQ. When the generated fetching-purpose self-increased address 118 can be also found from the fetch-target queue FTQ (that is, one instruction address pushed into the fetch-target queue FTQ matches the fetching-purpose self-increased address 118 generated in the same cycle), the instruction cache 104 may be switched back to receive the instruction address output from the fetch-target queue FTQ as the instruction-fetching address AddrL1i.

In total, the instruction-fetching address AddrL1i for accessing the cached instructions from the instruction cache 104 may be instruction addresses from the previous stage (no matter those output from the fetch-target queue FTQ or those directly transferred, bypassing the FTQ, to the instruction cache 104), the fetching-purpose self-increased addresses 118 (which may be instruction addresses increased from a branch target address and generated for the empty FTQ, or instruction addresses increased from a flushing address), or a flushing address 120/122. When the instruction-fetching address AddrL1i is an instruction address from the previous stage, the instruction cache 104 and the previous stage are operated in a synchronous mode. Otherwise, the instruction cache 104 and the previous stage are operated in an asynchronous mode. In the synchronous mode, the multiplexer 116 outputs an instruction address received from the fetch-target queue FTQ or outputs an instruction address AddrBP directly received from the multiplexer 124 (without passing the fetch-target queue FTQ) as the instruction-fetching address AddrL1i. In the asynchronous mode, the multiplexer 116 outputs the other received input 120, 122 or 118 as the instruction-fetching address AddrL1i. By switching between the synchronous mode and asynchronous mode, the instruction cache 104 is hardly delayed by the branch prediction, and the fetch-target queue FTQ is properly utilized.

In some situations, the requested instructions may not exist in the instruction cache 104 (cache missing). In response to cache missing, the missing instructions are loaded to the instruction cache 104 and then the missed address is output from the fetch-target queue FTQ again to fetch the instruction cache 104 for the requested instructions.

The microprocessor 100 of FIG. 1 further includes a queue PDQ, which is discussed below.

The branch predictor 110 generally use a memory (e.g. an SRAM) to record various information or tables, such as a table for branch target address cache (BTAC) or a branch history table (BHT). The branch target address cache (BTAC) table may include information of branch type, branch target address, and so on, of a branch instruction contained in each chunk. The branch history table BHT is a look-up table for determining whether to take the predicted branch or not. The information or tables may be dynamically updated as the branch predictor 110 operates. Since the branch predictor 110 is largely ahead of the instruction-fetching address AddrL1i, the accumulated update information is considerable and may be pushed into the queue PDQ for temporary storage. The update information will be read out from the queue PDQ in time and sent to the back-end pipeline of the microprocessor 100 for BTAC and BHT update.

In an exemplary embodiment, the instruction cache 104 and the branch predictor 110 are operated in the C, I, B, U stages of the multiple-stage pipeline of the microprocessor 100. There may be up to 20 stages of calculations in the pipeline. When the branch prediction of an instruction address AddrBP is completed (proceeding to the U stage) and the instruction address AddrBP is not bypassed by the branch prediction, the instruction address AddrBP is pushed into the fetch-target queue FTQ. In this way, the addresses queued in the fetch-target queue FTQ are necessarily meaningful (in the predicted direction).

Figure 2:
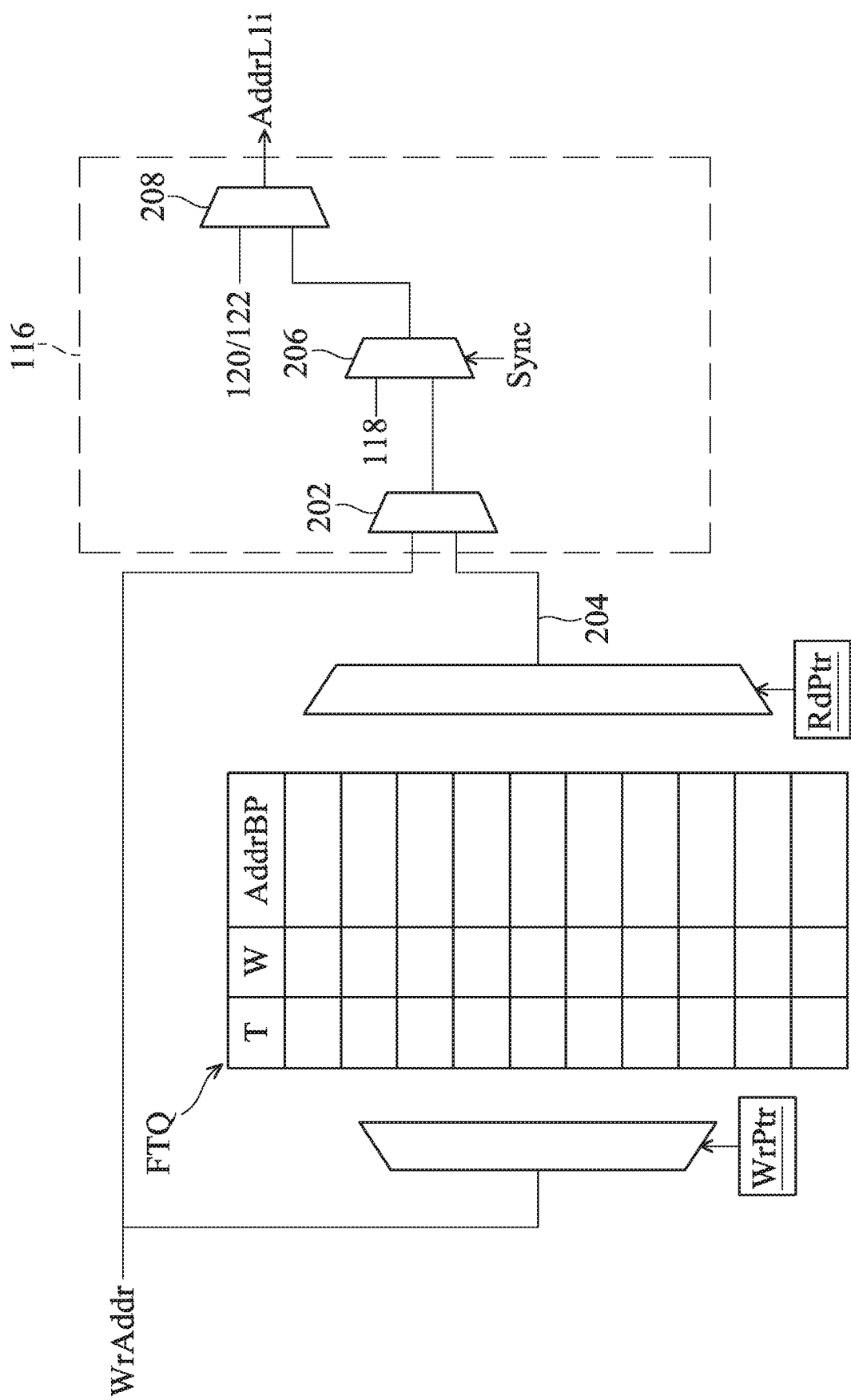
FIG. 2 details the design of the fetch-target queue FTQ and the multiplexer 116 in accordance with an exemplary embodiment of the present invention.

FIG. 2 details the design of the fetch-target queue FTQ and the multiplexer 116 in accordance with an exemplary embodiment of the present invention.

Each entry of the fetch-target queue FTQ may store three kinds of information: a taken branch flag T; a cross-chunk flag (or a wrap flag) W; and an instruction address AddrBP. In an exemplary embodiment, each entry stores 50 bits. The instruction address AddrBP occupies 48 bits. The taken branch flag T may be represented by one bit to show whether a branch instruction in the chunk indicated by the instruction address AddrBP is predicted to be taken. The cross-chunk flag W may be represented by one bit to show whether the taken branch is called by a branch instruction that is across two adjacent chunks. If yes, the branch instruction is partially in a first chunk (16B) and partially in a second chunk (the next 16B). When no branch is predicted from the chunk indicated by the instruction address AddrBP or when a branch predicted from the chunk indicated by the instruction address AddrBP is further predicted not to be taken, the cross-chunk flag W is not asserted. When branch called by a branch instruction across two adjacent chunks is predicted not to be taken, the second chunk is not bypassed and is certainly fetched later. There is no need to assert the cross-chunk flag W.

Each set of information (including T, W, and AddrBP) may be pushed into one entry of the fetch-target queue FTQ as indicated by a write pointer Wrptr. A read pointer Rdptr is provided to read one entry of the fetch-target queue FTQ and, accordingly, information (including T, W, and AddrBP) stored in the read entry is read out.

As shown in FIG. 2, the multiplexer 116 taught in FIG. 1 may include three multiplexers 202, 206, and 208. The multiplexer 202 receives an instruction address 204 (AddrBP) output from the fetch-target queue FTQ, and further directly receives (bypassing the fetch-target queue FTQ) an instruction address WrAddr that is guaranteed in the instruction fetching guide and waiting to be pushed into the fetch-target queue FTQ. When the fetch-target queue FTQ is empty and the write enable signal WrEn of the fetch-target queue FTQ is asserted, the multiplexer 202 works as a bypass mux to directly transfer the instruction address WrAddr to the multiplexer 206 to save the delay of the fetch-target queue FTQ. The multiplexer 206 is controlled by a synchronous signal Sync that is provided to switch between the synchronous mode and the asynchronous mode. When the synchronous signal Sync is true (corresponding to the synchronous mode), the instruction cache 104 receives an instruction address from the previous stage (i.e., from the multiplexer 202) as the instruction-fetching address AddrL1i. The instruction-fetching address AddrL1i received from the previous stage and transferred through the multiplexers 206 and 208 may be an instruction address output from the fetch-target queue FTQ or the instruction address WrAddr directly transferred from the previous stage bypassing the fetch target queue FTQ. When the synchronous signal Sync is false (corresponding to the asynchronous mode), the fetching-purpose self-increased addresses 118 is transferred to the next multiplexer 208 to be output as the instruction-fetching address AddrL1i of the instruction cache 104. The fetching-purpose self-increased addresses 118 may be increased from a branch target address 114 due to a predicted taken branch, or may be increased from a flushing address 120/122 due to a flushing event. The multiplexer 208 is controlled by the decoder 106 or the execution unit 108 in response to a flushing event. When the decoder 106 or the execution unit 108 triggers a flushing event, the multiplexer 208 outputs the flushing address 120/122 as the instruction-fetching address AddrL1i of the instruction cache 104.

In response to a cache missing event (i.e., the requested instructions have not been loaded to the instruction cache 104), the read pointer Rdptr of the fetch-target queue FTQ is reset to the entry storing the missed instruction address. When the requested instructions are ready in the instruction cache 104, the same instruction address pointed to by the read pointer Rdptr is output from the fetch-target queue FTQ again. Accordingly, the requested instructions are successfully fetched from the instruction cache 104.

Figure 3:
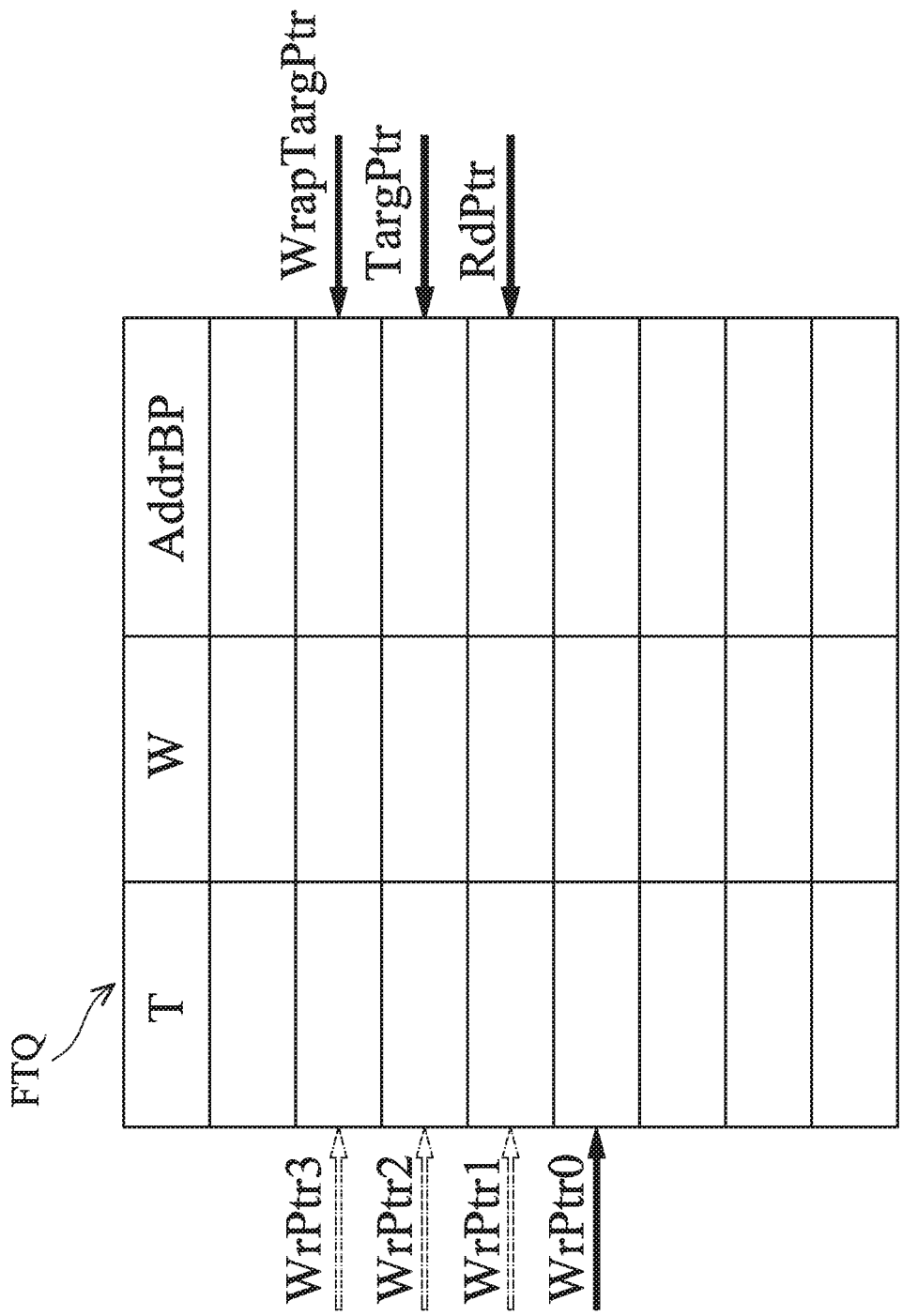
FIG. 3 illustrates how to push a plurality of instruction addresses whose branch prediction have been finished in parallel into the fetch-target queue FTQ and how the information queued in the fetch-target queue FTQ is popped out in accordance with an exemplary embodiment of the present invention.

In an exemplary embodiment, the branch predictor 110 performs branch prediction on a plurality of instruction addresses in parallel. FIG. 3 illustrates how to push a plurality of instruction addresses whose branch prediction have been finished in parallel into the fetch-target queue FTQ and how the information queued in the fetch-target queue FTQ is output in accordance with an exemplary embodiment of the present invention. In the following examples, the branch prediction is performed on three instruction addresses in parallel. For every three instruction addresses, the parallel branch prediction is performed to predict whether any branch in the three chunks indicated by the three instruction addresses will be taken. Furthermore, the parallel branch prediction also determines whether the taken branch is called by a branch instruction that is across two adjacent chunks (e.g., wrapping the two adjacent 16B chunks). When the predicted taken branch is called by a branch instruction wrapping the two adjacent chunks, both the instruction addresses indicating the two adjacent chunks are pushed into the fetch-target queue FTQ in the same cycle. Therefore, there may be up to four (=3+1) instruction addresses being pushed into the fetch-target queue FTQ in the same cycle. The starting entry of the four entries for the parallel storage of the four instruction addresses may be indicated by a write pointer Wrptr0. There are three more write pointers Wrptr1, Wrptr2, and Wrptr3 increased from the write pointer Wrptr0 pointing to the three entries following the starting entry. As indicated by the four write pointers Wrptr0 to Wrptr3, the parallel storage on the indicated four entries are accomplished. The access of the fetch-target queue FTQ further relates to a read pointer Rdptr, a branch target pointer TargPtr, and cross-chunk pointer WrapTargPtr. The read pointer Rdptr specifies the entry to be read to output information. When the entry indicated by the read pointer Rdptr relates to a predicted taken branch, the branch target pointer TargPtr points to the next entry that stores the branch target address of the predicted taken branch. When the taken branch is called by a branch instruction that is across two adjacent chunks (i.e., the cross-chunk flag W is asserted), the cross-chunk pointer WrapTargPtr points to an entry storing an instruction address indicating the next chunk related to the branch instruction. According to the pointers TargPtr and WrapTargPtr, the information of the branch target corresponding to the taken branch and the wrapped chunk can be directly obtained from the fetch-target queue FTQ. No further resources are wasted in accessing such information.

Figure 5A:
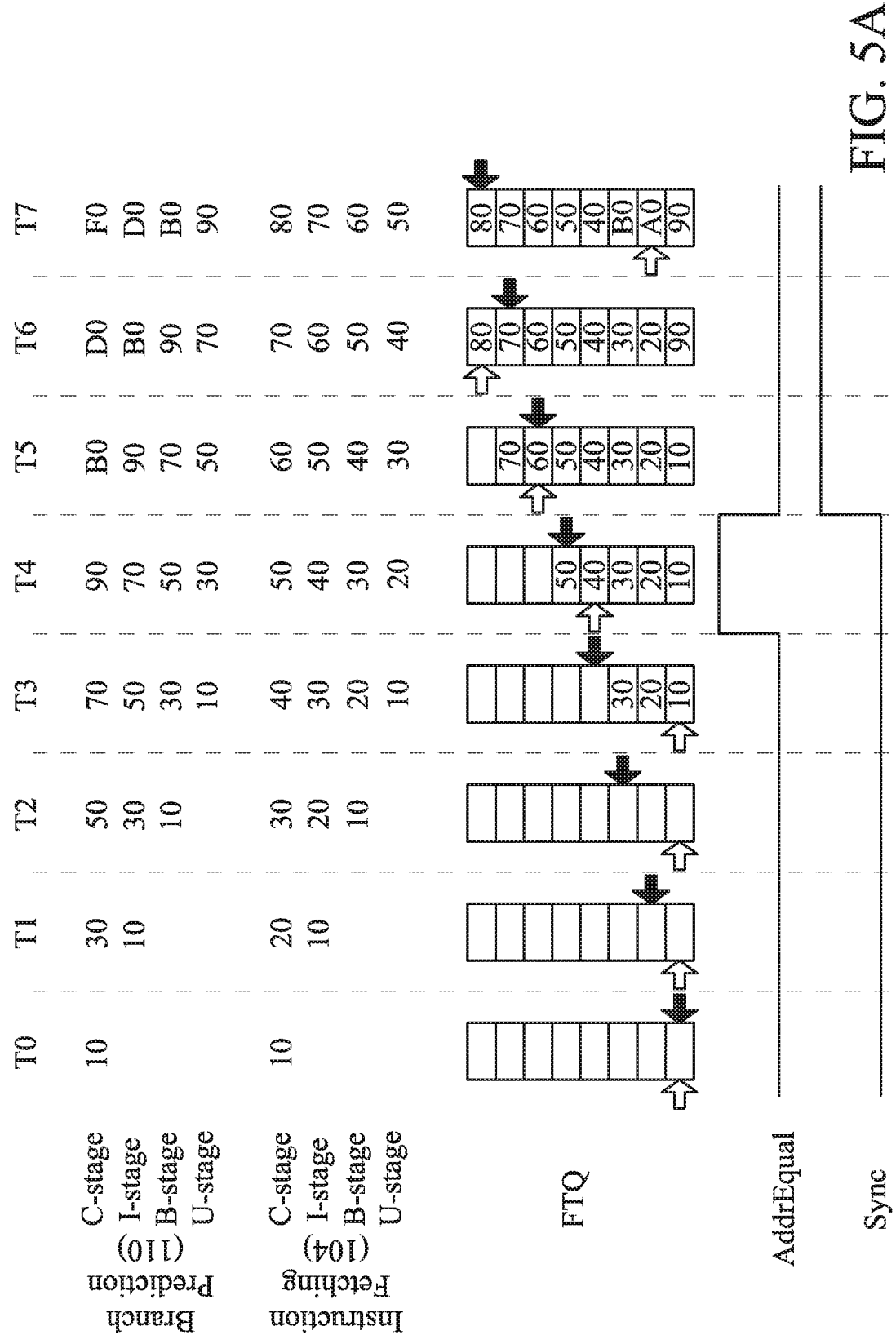
FIG. 5A illustrates when to pull up the synchronization signal Sync after a flushing event.
Figure 5B:
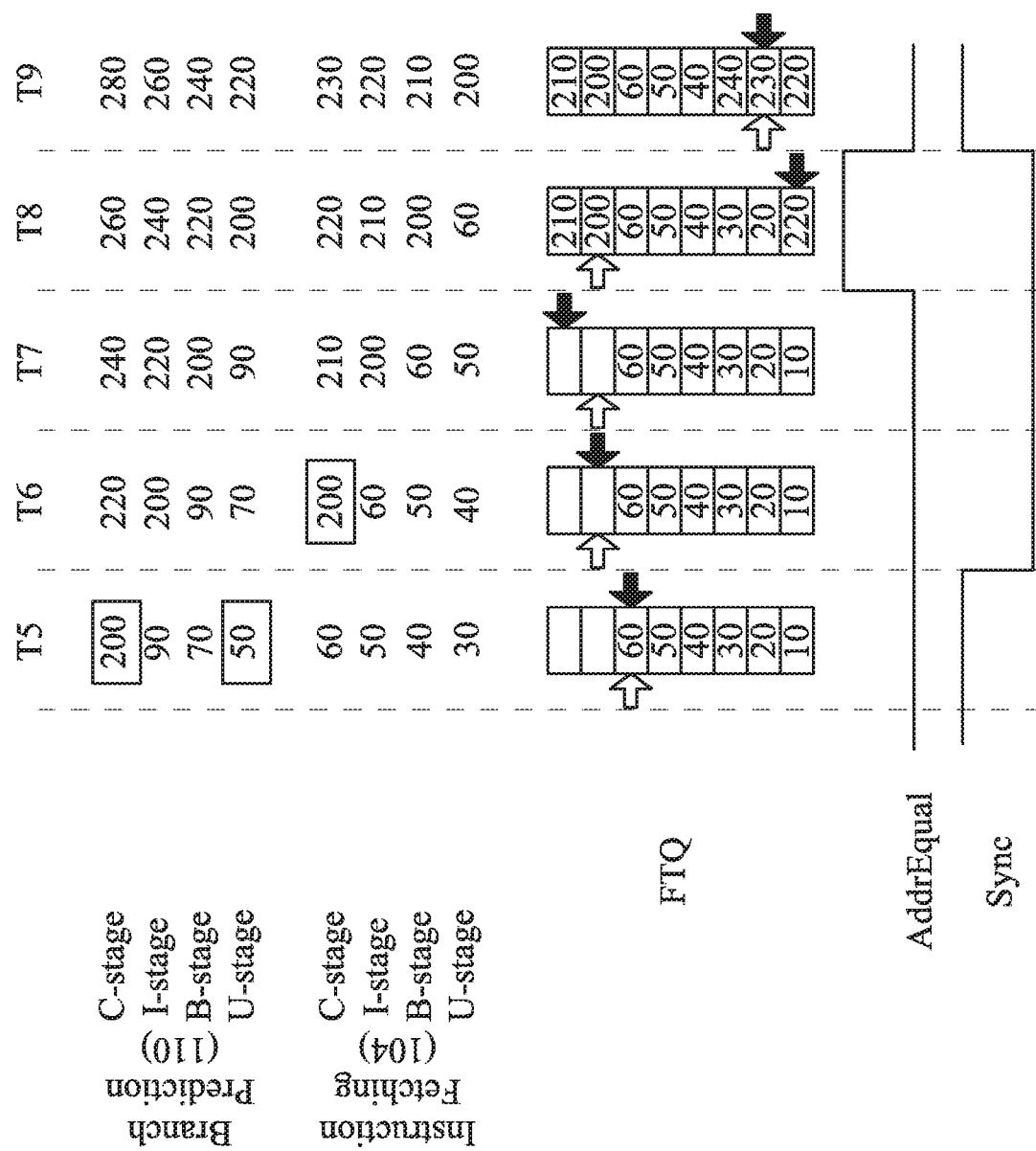
FIG. 5B shows another example, wherein unlike in FIG. 5A, a taken branch (jumping from instruction address 60 to instruction address 200) is predicted in cycle T5 and the fetch-target queue FTQ is not empty in cycle T5, and the way in which the synchronization signal Sync is changed is shown.
Figure 5C:
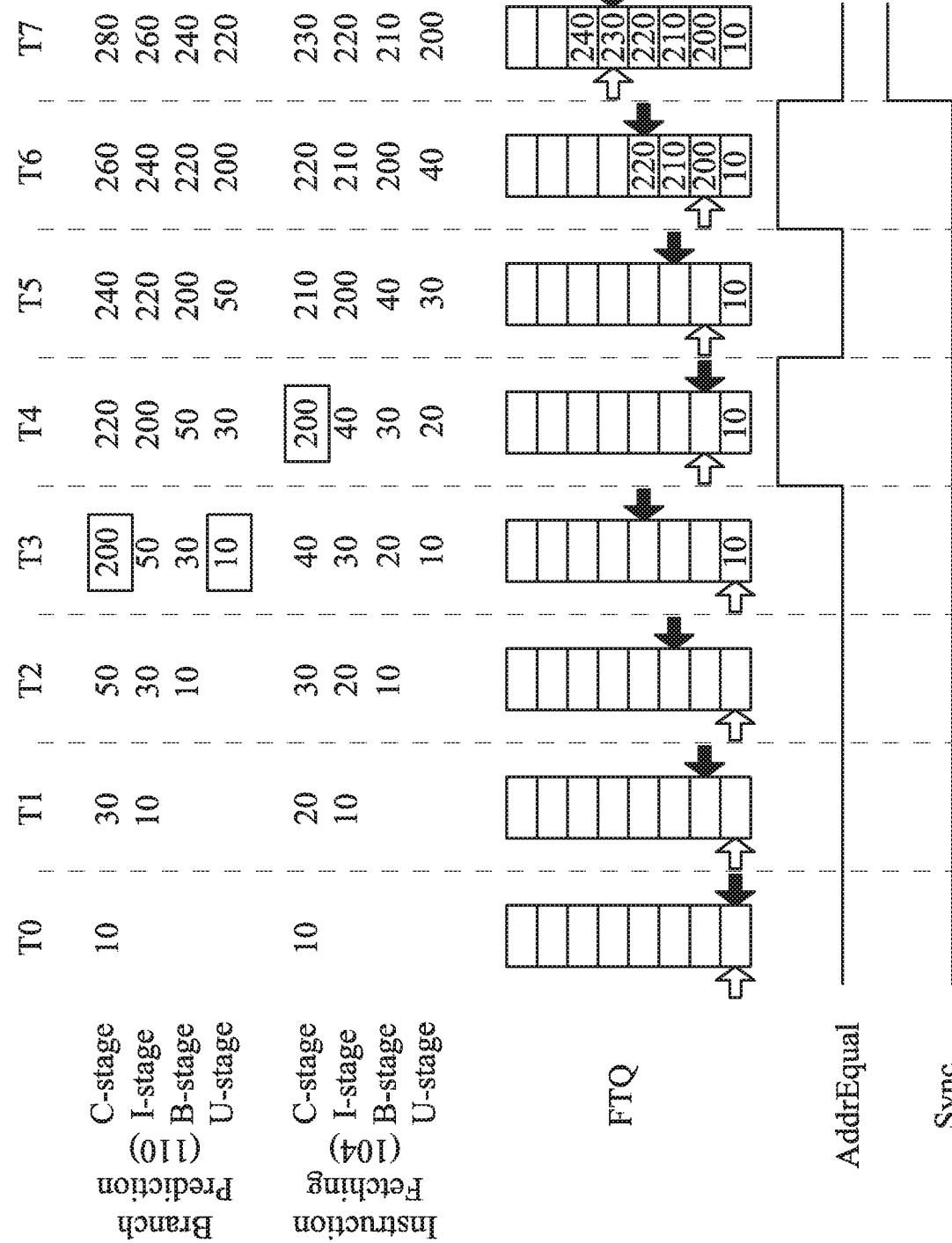
FIG. 5C shows another example, wherein next to a flushing event a taken branch is predicted, and how the synchronization signal Sync is changed is shown.

FIGS. 4A, 4B, and 4C illustrate how to fill in the instruction address AddrBP of each entry of the fetch-target queue FTQ in accordance with different exemplary embodiments of the present invention. The branch predictor 110 performs branch prediction for three instruction addresses in parallel. The branch predictor 110 involves multiple stages of first pipeline calculations, and the instruction cache 104 involves multiple stages of second pipeline calculations, too. In an exemplary embodiment, the branch predictor 110 and the instruction cache 104 both correspond to the C, I, B, and U stages of the pipelined processor 100. Branch prediction of three chunks indicated by instruction addresses PC, PC+16, and PC+32 are finished in parallel. As shown in FIGS. 5A, 5B and 5C, the branch prediction relate to C, I, B and U stages of pipeline calculations. In the following discussion, the three instruction addresses with branch prediction finished in parallel in the U stage are PC, PC+16, and PC+32, each indicates one chunk (16B) of instructions. The instruction addresses with finished branch prediction are pushed into the fetch-target queue FTQ according to a flag 'afterbr'. In the following discussion, there are one or two overlapping instruction addresses between the branch prediction finished in the current cycle and the branch prediction finished in the previous cycle. When the flag 'afterbr' is true, it means that the instruction address PC that just finished the U-stage pipeline calculations has not been processed in the branch prediction one cycle ahead. For example, the instruction address PC may be the branch target address of a taken branch, or the flushing address due to a flushing event. When the flag 'afterbr' is false (~afterbr), it means that the instruction address PC that just finished the U-stage pipeline calculations has been processed in the branch prediction one cycle ahead.

Referring to FIG. 4A, there is one overlapping instruction address between the branch prediction finished in the current cycle and the branch prediction finished in the previous cycle. For example, referring to the first pipeline stage of branch prediction (e.g., the C stage shown in FIGS. 5A to 5C), instruction addresses A, B, and C are processed in the first cycle, and then instruction addresses C, D, and E are processed in the second cycle. The instruction addresses C, D, and E are prediction-purpose self-increased instruction addresses obtained from the instruction addresses A, B, and C, and there is one overlapping instruction address C. Referring to the final pipeline stage of branch prediction (e.g., the U stage shown in FIGS. 5A to 5C), the branch prediction of the instruction addresses PC, PC+16, and PC+32 is finished in the current cycle. When the instruction address PC is not bypassed, table 410 shows what is pushed into the fetch-target queue FTQ to be recorded as the instruction address AddrBP.

When the instruction address PC has not been pushed into the fetch-target queue FTQ in the previous cycle (i.e., afterbr is true), the four entries pointed to by the four write pointers Wrptr0 . . . Wrptr3 may all work in the current cycle. The entry pointed to by the starting write pointer Wrptr0 stores the instruction address PC no matter how the branch prediction of the instruction addresses PC, PC+16 and PC+32 is. When there is no branch predicted to be taken in a chuck indicated by the instruction address PC, or when there is a branch predicted to be taken in the chunk indicated by the instruction address PC and the taken branch is called by a branch instruction across two adjacent chunks, the entry pointed to by the write pointer Wrptr1 stores the instruction address PC+16. When there is no branch predicted to be taken in the two chucks indicated by the instruction addresses PC and PC+16, or when there is no branch predicted to be taken in the chunk indicated by the instruction address PC but there is a branch predicted to be taken in the chunk indicated by the instruction address PC+16 and the taken branch is called by a branch instruction across two adjacent chunks, the entry pointed to by the write pointer Wrptr2 stores the instruction address PC+32. When there is no branch predicted to be taken in the two chucks indicated by the instruction addresses PC and PC+16, but there is a branch predicted to be taken in a chunk indicated by the instruction address PC+32 and the taken branch is called by a branch instruction across two adjacent chunks, the entry pointed to by the write pointer Wrptr3 stores the instruction address PC+48.

When the instruction address PC has been pushed into the fetch-target queue FTQ in the previous cycle (i.e., ~afterbr) and the instruction address PC+16 is not bypassed, the instruction addresses being pushed into the fetch-target queue FTQ in the current cycle as the instruction address AddrBP are discussed in this paragraph. The entry pointed to by the starting write pointer Wrptr0 stores the instruction address PC+16 no matter how the branch prediction of the instruction addresses PC+16 and PC+32 is. When there is no branch predicted to be taken in a chuck indicated by the instruction address PC+16, or when there is a branch predicted to be taken in the chunk indicated by the instruction address PC+16 and the taken branch is called by a branch instruction across two adjacent chunks, the entry pointed to by the write pointer Wrptr1 stores the instruction address PC+32. When there is no branch predicted to be taken in the chuck indicated by the instruction address PC+16, but there is a branch predicted to be taken in a chunk indicated by the instruction address PC+32 and the taken branch is called by a branch instruction across two adjacent chunks, the entry pointed to by the write pointer Wrptr2 stores the instruction address PC+48.

Referring to FIG. 4B, there are two overlapping instruction addresses between the branch prediction finished in the current cycle and the branch prediction finished in the previous cycle. For example, referring to the first pipeline stage of branch prediction (e.g., the C stage shown in FIGS. 5A to 5C), instruction addresses A, B, and C are processed in the first cycle, and then instruction addresses B, C, and D are processed in the second cycle. The instruction addresses B, C, and D are prediction-purpose self-increased instruction addresses obtained from the instruction addresses A, B, and C, and there are two overlapping instruction addresses B and C. Referring to the final pipeline stage of branch prediction (e.g., the U stage shown in FIGS. 5A to 5C), the branch prediction of the instruction addresses PC, PC+16, and PC+32 is finished in the current cycle. When the instruction address PC is not bypassed, table 420 shows what is pushed into the fetch-target queue FTQ to be recorded as the instruction address AddrBP. Compared with table 410, the difference is in the columns related to "~afterbr". The columns related to "afterbr" are the same as those columns shown in table 410 and are not described again below.

Referring to table 420, when the instruction address PC has been pushed into the fetch-target queue FTQ in the previous cycle (i.e., ~afterbr) and the instruction address PC+16 is not bypassed, the instruction addresses being pushed into the fetch-target queue FTQ in the current cycle as the instruction address AddrBP are discussed in this paragraph. The entry pointed to by the starting write pointer Wrptr0 stores the instruction address PC+32 no matter how the branch prediction of the instruction addresses PC+16 and PC+32 is. When there is a branch predicted to be taken in the chunk indicated by the instruction address PC+32 and the taken branch is called by a branch instruction across two adjacent chunks, the entry pointed to by the write pointer Wrptr1 stores the instruction address PC+48.

Referring to FIG. 4C, there are no overlapping instruction addresses between the branch prediction finished in the current cycle and the branch prediction finished in the previous cycle. For example, referring to the first pipeline stage of branch prediction (e.g., the C stage shown in FIGS. 5A to 5C), instruction addresses A, B, and C are processed in the first cycle, and then instruction addresses D, E, and F are processed in the second cycle. The prediction-purpose self-increased instruction addresses D, E, and F obtained from the instruction addresses A, B, and C do not overlap the instruction addresses A, B, and C. This example does not need to consider the flag "afterbr". Referring to the final pipeline stage of branch prediction (e.g., the U stage shown in FIGS. 5A to 5C), the branch prediction of the instruction addresses PC, PC+16, and PC+32 is finished in the current cycle. When the instruction address PC is not bypassed, table 430 shows what is pushed into the fetch-target queue FTQ to be recorded as the instruction address AddrBP.

In other exemplary embodiments, the number, N, of instruction addresses processed in parallel by the branch predictor 110 is not limited to 3 and may be other numbers. There may be up to N+1 entries of the fetch-target queue FTQ filled in each cycle. The size, M bytes, of the fetching chunk is not limited to 16 bytes.

To sum up, before pushing an instruction address AddrBP into the fetch-target queue FTQ, it should be checked whether the instruction address AddrBP is meaningful (not being bypassed by a taken branch), and whether the instruction address AddrBP has been pushed into the fetch-target queue FTQ in the previous cycle (for example, checking the flag "afterbr" or checking whether the current instruction address overlaps the instruction addresses processed in the previous cycle).

The following paragraphs discuss the source of the instruction-fetching address AddrL1i received by the instruction cache 104, and explains how the source is changed in response to switching between the synchronous mode and the asynchronous mode. As shown in FIG. 3, the fetch-target queue FTQ may operate according to the starting write pointer Wrptr0 and the read pointer Rdptr. In an exemplary embodiment, by comparing the starting write pointer Wrptr0 and the read pointer Rdptr, the instruction cache 104 is switched to receive the instruction-fetching address AddrL1i in the synchronous mode or in the asynchronous mode, and a synchronization signal Sync is switched to set the source of the instruction-fetching address AddrL1i operating the instruction cache 104. In this example, the fetch-target queue FTQ is the source of the instruction-fetching address AddrL1i in the synchronization mode. When the instruction cache 104 is switched to receive the instruction-fetching address AddrL1i in the asynchronous mode, the source of the instruction-fetching address AddrL1i is not the fetch-target queue FTQ.

In an exemplary embodiment, the read pointer Rdptr changes to pointing to the next entry every cycle. The instruction addresses AddrBP with branch prediction finished in parallel by the branch predictor 110 are pushed into the fetch-target queue FTQ according to the starting write pointer Wrptr0, to be marked in parallel by the write pointers Wrptr0, Wrptr1 . . . . In such a situation, the starting write pointer Wrptr0 is revised every cycle to point to the first entry that is allocated to store a first instruction address among the instruction addresses pushed into the fetch-target queue FTQ in the current cycle. When the pipeline of the microprocessor 100 is flushed, the fetch-target queue FTQ is cleared. In response to the returned flushing address 120/122, the starting write pointer Wrptr0 and the read pointer Rdptr are reset to a starting entry of the fetch-target queue FTQ. When the branch predictor 110 predicts a branch target address (that is, a branch predicted in the chunk indicated by the instruction address AddrBP is predicted to be taken) and no instruction address can be output from the fetch-target queue FTQ, the starting write pointer Wrptr0 and the read pointer Rdptr are revised to point to the first blank entry. In response to the flushing event or the taken branch, the instruction-fetching address AddrL1i input the instruction cache 104 may be the flushing address 120/122, or the branch target address 114 (directly transferred to the instruction cache 104 without through the fetch-target queue FTQ), or the fetching-purpose self-increased instruction addresses 118 obtained from the flushing address 120/122, or the fetching-purpose self-increased instruction addresses 118 obtained from the branch target address 114. At this moment, the synchronization signal Sync is de-asserted. When the read pointer Rdptr points to an entry the same as that pointed to by any of the parallel write pointers (Wrptr0, Wrptr1 . . . ), the instruction cache 104 is switched back to receive the instruction address AddrBP output from the fetch-target queue FTQ as the instruction-fetching address AddrL1i. In an exemplary embodiment, the read pointer Rdptr is equal to one of the write pointers Wrptr0, Wrptr1 . . . in the first cycle, and the instruction cache 104 is switched back to receive the instruction address AddrBP output from the fetch-target queue FTQ as the instruction-fetching address AddrL1i in the second cycle next to the first cycle. In the second cycle, the synchronization signal Sync is asserted.

In the aforementioned exemplary embodiments, the asynchronous mode is switched to the synchronous mode based on the pointer comparison. When being switched to the synchronous mode, the instruction cache 104 no longer receives the fetching-purpose self-increased address 118 as the instruction-fetching address AddrL1i. Instead, the instruction address AddrBP read out from the fetch-target queue FTQ is sent to the instruction cache 104 as the instruction-fetching address AddrL1i. In other exemplary embodiments, it is checked whether the fetching-purpose self-increased address 118 generated for accessing the instruction cache 104 is equal to any of the instruction addresses AddrBP pushed into the fetch-target queue FTQ in parallel and, accordingly, the asynchronous mode is switched to the synchronous mode (that is, switched from receiving the fetching-purpose self-increased address 118 as the instruction-fetching address AddrL1i to receiving the instruction address AddrBP output from the fetch-target queue FTQ as the instruction-fetching address AddrL1i). It is worth noting that in the first embodiment the write pointers (Wrptr0, Wrptr1 . . . ) are compared with the read pointer Rdptr and the pointer comparison only consumes a few resources. In the second exemplary embodiment, 48-bit address comparison is required. The pointers Rdptr, Wrptr0, Wrptr1 . . . are usually very short in length, for example, only three bits. The 3-bit pointer comparison in the first exemplary embodiment does not consume much resources of the microprocessor 100. The microprocessor 100 does not waste a lot of time in deciding the status of the synchronization signal Sync.

FIG. 5A illustrates when to pull up the synchronization signal Sync after a flushing event. In this illustrative example, the branch predictor 110 performs branch prediction for three instruction addresses in parallel, and there is one overlapping instruction address between every two adjacent cycles (refer to FIG. 4A). The branch predictor 110 involves multiple stages of first pipeline calculations, and the instruction cache 104 involves multiple stages of second pipeline calculations. In the following discussion, the branch predictor 110 and the instruction cache 104 both correspond to the C, I, B, and U stages of the pipelined processor 100. It is worth noting that, for simplicity, only the starting address of the parallel branch prediction in each cycle is marked, and the other two consecutive addresses are not shown in the figure. The starting write pointer Wrptr0 of the fetch-target queue FTQ is shown by the hollow arrow on the left, and the read pointer Rdptr is shown by the solid arrow on the right. For simplicity, the other write pointers (Wrptr1 to Wrptr3) are not marked in the figures.

In cycle T0, the synchronization signal Sync is de-asserted in response to a flushing event. The instruction cache 104 and the fetch-target queue FTQ are asynchronous. The fetch-target queue FTQ is cleared, and the starting write pointer Wrptr0 and read pointer Rdptr are reset to the starting entry of the fetch-target queue FTQ. As shown, the flushing address 10 and its subsequent addresses 20 and 30 are input to the branch predictor 110 and processed in parallel in the C-stage pipeline. When the branch predictor 110 switches to the branch prediction of the flushing address 10, the flushing address 10 is also input into the C-stage pipeline of the instruction cache 104 as the instruction-fetching address AddrL1i for accessing the instruction cache 104.

In the asynchronous mode, the read pointer Rdptr changes to pointing to the next entry in cycle T1. Three prediction-purpose self-increased addresses 30, 40, and 50 (only the starting address 30 is marked in the figure) are input into the C-stage pipeline of the branch predictor 110. A fetching-purpose self-increased address 20 is input into the C-stage pipeline of the instruction cache 104 as the instruction-fetching address AddrL1i for accessing the instruction cache 104.

In cycle T2, the read pointer Rdptr changes to pointing to the next entry. Three prediction-purpose self-increased addresses 50, 60, and 70 (only the starting address 50 is marked in the figure) are input into the C-stage pipeline of the branch predictor 110. A fetching-purpose self-increased address 30 is input into the C-stage pipeline of the instruction cache 104 as the instruction-fetching address AddrL1i for accessing the instruction cache 104.

In cycle T3, the read pointer Rdptr changes to pointing to the next entry. The instruction addresses 10, 20, and 30 (only the starting address 10 is marked in the figure) proceed to the U-stage pipeline of the branch predictor 110. In the U-stage pipeline, the branch prediction for the three chunks indicated by the addresses 10, 20 and 30 is completed, and it is determined that no branch is predicted in the three chunks. Referring to table 410 of FIG. 4A, the instruction addresses 10, 20, and 30 should be pushed into the fetch-target queue FTQ. The write pointers Wrptr0, Wrptr1, and Wrptr2 are set to point to the three target entries, and the starting write pointer Wrptr0 points to the first entry for storing the first instruction address pushed into the fetch-target queue FTQ in the current cycle (T3). As shown, the instruction address 10 is written to the entry indicated by the starting write pointer Wrptr0, and the instruction addresses 20 and 30 are written to the entries indicated by Wrptr1 and Wrptr2. Furthermore, in cycle T3, three prediction-purpose self-increased addresses 70, 80, and 90 (only the starting address 70 is marked in the figure) are input into the C-stage pipeline of the branch predictor 110, and a fetching-purpose self-increased address 40 for instruction fetching is input to the C-stage pipeline of the instruction cache 104.

In cycle T4, the read pointer Rdptr changes to pointing to the next entry. The instruction addresses 30, 40, and 50 (only the starting address 30 is marked in the figure) proceed to the U-stage pipeline of the branch predictor 110. In the U-stage pipeline, the branch prediction for the three chunks indicated by the addresses 30, 40 and 50 is completed, and it is predicted that no branch will be taken in the three chunks. According to the table 410 of FIG. 4A, the instruction addresses 40 and 50 non-overlapping the instruction addresses processed in the previous cycle should be pushed into the fetch-target queue FTQ. Write pointers Wrptr0 and Wrptr1 are revised to point to two target entries for the storage of the instruction addresses 40 and 50, wherein the starting write pointer Wrptr0 is revised to point to the entry that is allocated to store the first instruction address 40 pushed into the fetch-target queue FTQ in the current cycle (T4). As indicated by the revised write pointers Wrptr0 and Wrptr1, the instruction addresses 40 and 50 are pushed into the fetch-target queue FTQ. Furthermore, in cycle T4, three prediction-purpose self-increased addresses 90, A0, and B0 (only the starting address 90 is marked in the figure) are input into the C-stage pipeline of the branch predictor 110, and a fetching-purpose self-increased address 50 is input into the C-stage pipeline of the instruction cache 104. It is worth noting that in the current cycle T4, the read pointer Rdptr is equal to the write pointer Wrptr1 (one of the parallel write pointers Wrptr0 and Wrptr1). A comparison signal AddrEqual is pulled up. The entry indicated by the equal pointers does store an address (50), which meets the conditions of pulling up the synchronization signal Sync.

In response to the comparison signal AddrEqual that is high in cycle T4, the synchronization signal Sync is pulled up in cycle T5. In cycle T5, the read pointer Rdptr changes to pointing to the next entry. The instruction addresses 50, 60, and 70 (only the starting address 50 is marked in the figure) proceed to the U-stage pipeline of the branch predictor 110. In the U-stage pipeline, the branch prediction for the three chunks indicated by the addresses 50, 60 and 70 is completed, and it is predicted that no branch in the three chunks will be taken. According to the table 410 of FIG. 4A, the instruction addresses 60 and 70 non-overlapping the instruction addresses processed in the previous cycle should be pushed into the fetch-target queue FTQ. Write pointers Wrptr0 and Wrptr1 are revised to point to the two target entries for the storage of the instruction addresses 60 and 70, wherein the starting write pointer Wrptr0 is revised to point to the entry that is allocated to store the first instruction address 60 pushed into the fetch-target queue FTQ in the current cycle (T5). As indicated by the revised write pointers Wrptr0 and Wrptr1, the instruction addresses 60 and 70 are pushed into the fetch-target queue FTQ. Furthermore, in cycle T5, three prediction-purpose self-increased addresses B0, C0, and D0 (only the starting address B0 is marked in the figure) are input into the C-stage pipeline of the branch predictor 110. As the synchronization signal Sync is high, the instruction cache 104 and the fetch-target queue FTQ are synchronized. The instruction cache 104 is switched back to receive an instruction address read out from the fetch-target queue FTQ as the instruction-fetching address AddrL1i. As indicated by the read pointer Rdptr, address 60 is read out from the fetch-target queue FTQ as the instruction-fetching address AddrL1i to be processed by the C-stage pipeline of the instruction cache 104. In the synchronous mode, the comparison of the pointers Wrptr and Rdptr is not required.

In cycle T6, the read pointer Rdptr changes to pointing to the next entry. The instruction addresses 70, 80, and 90 (only the starting address 70 is marked in the figure) proceed to the U-stage pipeline of the branch predictor 110. In the U-stage pipeline, the branch prediction for the three chunks indicated by the addresses 70, 80 and 90 is completed, and it is predicted that no branch in the three chunks will be taken. According to the table 410 of FIG. 4A, the instruction addresses 80 and 90 non-overlapping the instruction addresses processed in the previous cycle should be pushed into the fetch-target queue FTQ. Write pointers Wrptr0 and Wrptr1 are revised to point to the two target entries for the storage of the instruction addresses 80 and 90, wherein the starting write pointer Wrptr0 is revised to point to the entry that is allocated to store the first instruction address 80 pushed into the fetch-target queue FTQ in the current cycle (T6). In particular, because the starting write pointer Wrptr0 already points to the final entry of the fetch-target queue FTQ, the subsequent write pointer Wrptr1 is revised to point to an entry occupied by invalid data in the fetch-target queue FTQ. The entries prior to the entry indicated by the read pointer Rdptr are regarded as storing invalid data. As shown, the write pointer Wrptr1 is revised to point to the starting entry of the fetch-target queue FTQ and the invalid address originally stored in the starting entry is overwritten by the instruction address 90. Furthermore, in cycle T6, prediction-purpose self-increased addresses D0, E0, and F0 (only the starting address D0 is marked in the figure) are input into to the C-stage pipeline of the branch predictor 110. Because the synchronization signal Sync is kept high in cycle T6, the instruction cache 104 and the fetch-target queue FTQ are synchronized. According to the read pointer Rdptr, instruction address 70 is read out from the fetch-target queue FTQ as the instruction-fetching address AddrL1i and input the C-stage pipeline of the instruction cache 104.

In cycle T7, the read pointer Rdptr changes to pointing to the next entry. The instruction addresses 90, A0, and B0 (only the starting address 90 is marked in the figure) proceed to the U-stage pipeline of the branch predictor 110. In the U-stage pipeline, the branch prediction for the three chunks indicated by the addresses 90, A0, and B0 is completed, and it is predicted that no branch in the three chunks will be taken. According to the table 410 of FIG. 4A, the instruction addresses A0 and B0 non-overlapping the instruction addresses processed in the previous cycle should be pushed into the fetch-target queue FTQ. Write pointers Wrptr0 and Wrptr1 are revised to point to the two target entries for the storage of the instruction addresses A0 and B0, wherein the starting write pointer Wrptr0 is revised to point to the entry that is allocated to store the first instruction address A0 pushed into the fetch-target queue FTQ in the current cycle (T7). As indicated by the revised write pointers Wrptr0 and Wrptr1, the instruction addresses A0 and B0 are pushed into the fetch-target queue FTQ. Furthermore, in cycle T7, prediction-purpose self-increased addresses F0, G0, and H0 (only the starting address F0 is marked in the figure) are input into to the C-stage pipeline of the branch predictor 110. Because the synchronization signal Sync is kept high in cycle T7, the instruction cache 104 and the fetch-target queue FTQ are synchronized. According to the read pointer Rdptr, instruction address 80 is read out from the fetch-target queue FTQ as the instruction-fetching address AddrL1i and input into the C-stage pipeline of the instruction cache 104.

Referring to the cycles T0 to T4 shown in FIG. 5A, because of the flushing event, the fetch-target queue FTQ is not ready to provide the instruction addresses required in the instruction fetching of the instruction cache 104. However, such a situation does not delay the instruction fetching of the instruction cache 104. Instruction addresses 10, 20, 30, 40, and 50 are supplied to the instruction cache 104 as the instruction-fetching address AddrL1i in time through the signals 120/122 or 118.

FIG. 5B shows another example. Unlike in FIG. 5A, a taken branch (jumping from instruction address 60 to instruction address 200) is predicted in cycle T5. Note that in cycle T5 the fetch-target queue FTQ is not empty. FIG. 5B shows how the synchronization signal Sync changes.

Unlike in FIG. 5A, the instruction address 70 is bypassed in FIG. 5B due to the taken branch (60→200). In cycle T5 of FIG. 5B, the instruction address 70 is not pushed into the fetch-target queue FTQ and, starting from the branch target address 200, instruction addresses 200, 210, and 220 (only the starting address 200 is marked in the figure) are sent into the C-stage pipeline of the branch predictor 110 in parallel.

In cycle T6, the read pointer Rdptr changes to pointing to the next entry and thereby the read pointer Rdptr leads all of the queued addresses preceding the address 60. It means that all addresses not bypassed by the predicted taken branch have been read out from the fetch-target queue FTQ in the early time. Thus, the synchronization signal Sync is pulled down in cycle T6. The starting write pointer Wrptr0 is also revised to point to a blank entry just following the used entries in the fetch-target queue FTQ. As shown, the starting write pointer Wrptr0 is revised to point to the blank entry next to the entry occupied by the instruction address 60. Although the branch prediction of the instruction addresses 70, 80, and 90 proceed to the U-stage pipeline (that is, the branch prediction in the three chunks indicated by the instruction addresses 70, 80, and 90 is completed), it is meaningless. The chunks indicated by the instruction addresses 70, 80, and 80 are bypassed by the predicted taken branch. Thus, the instruction addresses 70, 80 and 90 should not be pushed into the fetch-target queue FTQ. In cycle T6, prediction-purpose self-increased addresses 220, 230, 240 (only the starting address 220 is marked in the figure) are input the C-stage pipeline of the branch predictor 110 in parallel. Because the pulled-down synchronization signal Sync means that the instruction cache 104 and the fetch-target queue FTQ are asynchronous, the branch target address 200 is directly input into the C-stage pipeline of the instruction cache 104 and bypassing the fetch-target queue FTQ. In another exemplary embodiment wherein the circuit of FIG. 2 is adopted, the synchronization signal Sync is kept high in cycle T6 and, through the bypass multiplexer 202 and the multiplexer 206, the branch target address 200 directly received from the branch predictor 110 (not read out from FTQ) is transferred to the instruction cache 104 as the instruction-fetching address AddrL1i.

In cycle T7, the read pointer Rdptr changes to pointing to the next entry. Instruction addresses 90, A0, and B0 proceed to the U-stage pipeline operation of the branch predictor 110. The branch prediction for the three chunks indicated by the bypassed instruction addresses 90, A0 and B0 is completed but meaningless. Thus, the three instruction addresses 90, A0 and B0 are not pushed into the fetch-target queue FTQ. Prediction-purpose self-increased addresses 240, 250, and 260 (only the starting address 240 is marked in the figure) are input into the C-stage pipeline of the branch predictor 110. Because the instruction cache 104 and the fetch-target queue FTQ are still asynchronous, a fetching-purpose self-increased address 210 is input into the C-stage pipeline of the instruction cache 104.

In cycle T8, the read pointer Rdptr changes to pointing to the next entry. Instruction addresses 200, 210, and 220 (only the starting address 200 is marked in the figure) proceed to the U-stage pipeline of the branch predictor 110. The branch prediction for the three chunks indicated by the instruction addresses 200, 210, and 220 is completed, and it is predicted that no branch will be taken in the three chunks. According to the table 410 of FIG. 4A, the instruction addresses 200, 210 and 220 should be pushed into the fetch-target queue FTQ. Write pointers Wrptr0, Wrptr1, and Wrptr2 are revised to point to the three target entries for the storage of the instruction addresses 200, 210 and 220, wherein the starting write pointer Wrptr0 is revised to point to the entry that is allocated to store the first instruction address 200 pushed into the fetch-target queue FTQ in the current cycle (T8). As indicated by the revised write pointers Wrptr0, Wrptr1, and Wrptr2, the instruction addresses 200, 210 and 220 are pushed into the fetch-target queue FTQ. Furthermore, in cycle T8, three prediction-purpose self-increased addresses 260, 270, and 280 (only the starting address 260 is marked in the figure) are input into the C-stage pipeline of the branch predictor 110 in parallel and, due to the asynchronous mode, a fetching-purpose self-increased address 220 is input into the C-stage pipeline of the instruction cache 104. It is worth noting that in the current cycle T8, the read pointer Rdptr is equal to the write pointer Wrptr2 (one of the parallel write pointers Wrptr0, Wrptr1 and Wrptr2). A comparison signal AddrEqual is pulled up. The entry indicated by the equal pointers does store an address (220), which meets the conditions of pulling up the synchronization signal Sync.

In response to the comparison signal AddrEqual that is high in cycle T8, the synchronization signal Sync is pulled up in cycle T9. In cycle T9, the read pointer Rdptr changes to pointing to the next entry. The instruction addresses 220, 230, and 240 (only the starting address 220 is marked in the figure) proceed to the U-stage pipeline of the branch predictor 110. In the U-stage pipeline, the branch prediction for the three chunks indicated by the addresses 5220, 230, and 240 is completed, and it is predicted that no branch in the three chunks will be taken. According to the table 410 of FIG. 4A, the instruction addresses 230 and 240 non-overlapping the instruction addresses processed in the previous cycle should be pushed into the fetch-target queue FTQ. Write pointers Wrptr0 and Wrptr1 are revised to point to the two target entries for the storage of the instruction addresses 230 and 240, wherein the starting write pointer Wrptr0 is revised to point to the entry that is allocated to store the first instruction address 230 pushed into the fetch-target queue FTQ in the current cycle (T9). As indicated by the revised write pointers Wrptr0 and Wrptr1, the instruction addresses 230 and 240 are pushed into the fetch-target queue FTQ. Furthermore, in cycle T9, three prediction-purpose self-increased addresses 280, 290, and 300 (only the starting address 280 is marked in the figure) are input into the C-stage pipeline of the branch predictor 110 in parallel. As the synchronization signal Sync is high, the instruction cache 104 and the fetch-target queue FTQ are synchronized. The instruction cache 104 is switched back to receive an instruction address read out from the fetch-target queue FTQ as the instruction-fetching address AddrL1i. As indicated by the read pointer Rdptr, address 230 is read out from the fetch-target queue FTQ as the instruction-fetching address AddrL1i to be processed by the C-stage pipeline of the instruction cache 104. In the synchronous mode, the comparison of the pointers Wrptr and Rdptr is not required.

Because of the taken branch predicted in cycle T5 shown in FIG. 5B, the fetch-target queue FTQ is not ready to provide the instruction-fetching addresses AddrL1i required in cycles T6 to T8 for the instruction fetching of the instruction cache 104. However, the instruction cache 104 is not delayed by such a situation. In the three cycles T6, T7, and T8, instruction addresses 200, 210, and 220 corresponding to the taken branch are supplied to the instruction cache 104 as the instruction-fetching addresses AddrL1i through other signal paths.

FIG. 5C shows another example, wherein next to a flushing event a taken branch is predicted. FIG. 5C shows when to pull up the synchronous signal Sync.

Unlike the example illustrated in FIG. 5A, FIG. 5C shows that the taken branch (jumping from address 10 to address 200) is predicted in cycle T3. In cycle T3, the branch predictor 110 completes the branch prediction of the three chunks indicated by instruction addresses 10, 20, and 30 (only the starting address 10 is shown in the figure). According to the predicted taken branch (jumping from address 10 to address 200), the instruction addresses 20 and 30 that will be bypassed should not be pushed into the fetch-target queue FTQ. Only the instruction address 10 is pushed into the fetch-target queue FTQ in cycle T3. Furthermore, starting from the branch target address 200, instruction addresses 200, 210, and 220 (only the starting address 200 is marked in the figure) are sent into the C-stage pipeline of the branch predictor 110 in parallel.

In cycle T4, both the read pointer Rdptr and the write pointer Wrptr0 are revised to point to a blank entry next to the non-empty entries of the fetch-target queue FTQ. In this example, the pointers Rdptr and Wrptr0 are revised to point to the blank entry next to the entry storing the instruction address 10. Instruction addresses 30, 40, and 50 proceed to the U-stage pipeline of the branch predictor 110. Although the branch prediction of the three chunks indicated by the instruction addresses 30, 40, and 50 is completed in cycle T4, it is meaningless. Because the instruction addresses 30, 40, and 50 are bypassed and should not be pushed into the fetch-target queue FTQ. In cycle T4, prediction-purpose self-increased addresses 220, 230 and 240 (only the starting address 220 is shown in the figure for simplicity) are input into the C-stage pipeline of the branch predictor 110. The instruction cache 104 and the fetch-target queue FTQ are asynchronous in cycle T4. The branch target address 200 is input into the C-stage pipeline of the instruction cache 104 bypassing the fetch-target queue FTQ. Note that the comparison signal AddrEqual is asserted in cycle T4 because the starting write pointer Wrptr0 is equal to the read pointer Rdptr. However, the entry indicated by the starting write pointer Wrptr0 is empty. The starting write pointer Wrptr0 does not point to valid information. The requirement to switching from the asynchronous mode to the synchronous mode is not satisfied.

In cycle T5, the read pointer Rdptr changes to pointing to the next entry. Instruction addresses 50, 60, and 70 (only the starting address 50 is shown in the figure for simplicity) proceed to the U-stage pipeline of the branch predictor 110. The related branch prediction is completed but meaningless (because the instruction addresses 50, 60, and 70 are bypassed due to the predicted taken branch). The three instruction addresses 50, 60, and 70 should not be pushed into the fetch-target queue FTQ. In cycle T5, prediction-purpose self-increased addresses 240, 250, and 260 (only the starting address 240 is shown in the figure for simplicity) are input into the C-stage pipeline of the branch predictor 110 in parallel. Since the instruction cache 104 and the fetch-target queue FTQ are asynchronous, a fetching-purposed self-increased address 210 is input into the C-stage pipeline of the instruction cache 104.

In cycle T6, the read pointer Rdptr changes to pointing to the next entry. Instruction addresses 200, 210, and 220 (only the starting address 200 is shown in the figure for simplicity) proceed to the U-stage pipeline of the branch predictor 110. The related branch prediction is completed and no taken branch is predicted. According to the table 410 of FIG. 4A, the instruction addresses 200, 210 and 220 should be pushed into the fetch-target queue FTQ. Write pointers Wrptr0, Wrptr1, and Wrptr2 are revised to point to the three target entries for the storage of the instruction addresses 200, 210 and 220, wherein the starting write pointer Wrptr0 is revised to point to the entry that is allocated to store the first instruction address 200 pushed into the fetch-target queue FTQ in the current cycle (T6). As indicated by the revised write pointers Wrptr0, Wrptr1, and Wrptr2, the instruction addresses 200, 210 and 220 are pushed into the fetch-target queue FTQ. Furthermore, in cycle T6, three prediction-purpose self-increased addresses 260, 270, and 280 (only the starting address 260 is marked in the figure) are input into the C-stage pipeline of the branch predictor 110 in parallel and, due to the asynchronous mode, a fetching-purpose self-increased address 220 is input into the C-stage pipeline of the instruction cache 104. It is worth noting that in the current cycle T6, the read pointer Rdptr is equal to the write pointer Wrptr2 (one of the parallel write pointers Wrptr0, Wrptr1 and Wrptr2). A comparison signal AddrEqual is pulled up. The entry indicated by the equal pointers does store an address (220), which meets the conditions of pulling up the synchronization signal Sync.

In response to the comparison signal AddrEqual that is high in cycle T6, the synchronization signal Sync is pulled up in cycle T7. In cycle T7, the read pointer Rdptr changes to pointing to the next entry. The instruction addresses 220, 230, and 240 (only the starting address 220 is marked in the figure) proceed to the U-stage pipeline of the branch predictor 110. In the U-stage pipeline, the branch prediction for the three chunks indicated by the addresses 5220, 230, and 240 is completed, and it is predicted that no branch in the three chunks will be taken. According to the table 410 of FIG. 4A, the instruction addresses 230 and 240 non-overlapping the instruction addresses processed in the previous cycle should be pushed into the fetch-target queue FTQ. Write pointers Wrptr0 and Wrptr1 are revised to point to the two target entries for the storage of the instruction addresses 230 and 240, wherein the starting write pointer Wrptr0 is revised to point to the entry that is allocated to store the first instruction address 230 pushed into the fetch-target queue FTQ in the current cycle (T7). As indicated by the revised write pointers Wrptr0 and Wrptr1, the instruction addresses 230 and 240 are pushed into the fetch-target queue FTQ. Furthermore, in cycle T7, three prediction-purpose self-increased addresses 280, 290, and 300 (only the starting address 280 is marked in the figure) are input into the C-stage pipeline of the branch predictor 110 in parallel. As the synchronization signal Sync is high, the instruction cache 104 and the fetch-target queue FTQ are synchronized. The instruction cache 104 is switched back to receive an instruction address read out from the fetch-target queue FTQ as the instruction-fetching address AddrL1i. As indicated by the read pointer Rdptr, an instruction address 230 is read out from the fetch-target queue FTQ as the instruction-fetching address AddrL1i to be input into the C-stage pipeline of the instruction cache 104. In the synchronous mode, the comparison of the pointers Wrptr and Rdptr is not required.

In FIG. 5C, the fetch-target queue FTQ is not ready to provide the instruction cache 104 with the required instruction-fetching address AddrL1i until cycle T7. However, such a situation does not delay the instruction fetching of the instruction cache 104. Through other signal paths, the flushing address 10, the branch target address 200, and the instruction addresses 210 and 220 increased from the instruction address 200 are sent to the instruction cache 104 as the instruction-fetching address AddrL1i in time. Although some resources are wasted in the instruction cache 104 for the instruction fetching of addresses 20, 30, and 40, the disclosure is still a high-efficiency design.

Whether it is a flushing event, or a predicted taken branch (i.e., having a branch target address being predicted), decoupling the branch predictor 110 from the instruction cache 104 by the fetch-target queue FTQ considerably improves the efficiency of the microprocessor 100.

The following paragraphs specifically explain the comparison signal AddrEqual. When the comparison signal AddrEqual is high, it means that in the fetch-target queue FTQ the read pointer Rdptr is equal to one of the write pointers Wrptr0 . . . Wrptr3. The comparison signal AddrEqual is:

$$AddrEqual=((Wrptr0==Rdptr) \& WrEn0)|\\(Wrptr1==Rdptr) \& WrEn1)|(Wrptr2==Rdptr) \&\\WrEn2)|(Wrptr3==Rdptr) \& WrEn3)$$

WrEn0 . . . WrEn3 are provided to enable the writing on the FTQ entries indicated by the write pointers Wrptr0 . . . Wrptr3. In response to the comparison signal AddrEqual being pulled high, the synchronization signal Sync is pulled high in the next cycle. The instruction cache 104 and the fetch-target queue FTQ are synchronized.

In another exemplary embodiment, the comparison signal AddrEqual depends on the instruction address comparison. The instruction addresses pushed into the fetch-target queue FTQ according to the write pointers Wrptr0 . . . Wrptr3 are wrdata0 . . . wrdata3, and instruction address read out from the fetch-target queue FTQ according to the read pointers Rdptr is rddata. The comparison signal AddrEqual is:

$$\begin{aligned}\text{AddrEqual}=&((\text{wrdata0}==\text{rddata})\ \&\ \text{WrEn0})|\\&(\text{wrdata1}==\text{rddata})\ \&\ \text{WrEn1})|\\&(\text{wrdata2}==\text{rddata})\ \&\ \text{WrEn2})|\\&(\text{wrdata3}==\text{rddata})\ \&\ \text{WrEn3})\end{aligned}$$

The following specifically discusses the read pointer Rdptr and a write pointer Wrptr (for setting Wrptr0 . . . Wrptr3) required operating the fetch target queue FTQ. The write pointer Wrptr may be updated according to the number of instruction addresses pushed into the fetch-target queue FTQ in the previous cycle. For example, if two instruction addresses are pushed into the fetch-target queue FTQ in the first cycle, the write pointer is updated as Wrptr+2 in the second cycle. The number of instruction addresses pushed into the fetch-target queue FTQ depends on the branch prediction performed by the branch predictor 110. In the illustrated embodiment, the number of instruction addresses pushed into the fetch-target queue FTQ per cycle may be 0-4, which is controlled by the write enable signals WrEn0 . . . WrEn3 corresponding to the write pointers Wrptr0 . . . Wrptr3. As illustrated in the embodiments of FIGS. 4A-4C, if a write condition is satisfied, the write enable signal WrEn # of the corresponding write indicator Wrptr # (# is a number) is pulled high, and an instruction address AddrBP is written into the entry indicated by the corresponding write indicator Wrptr #.

Figure 6:
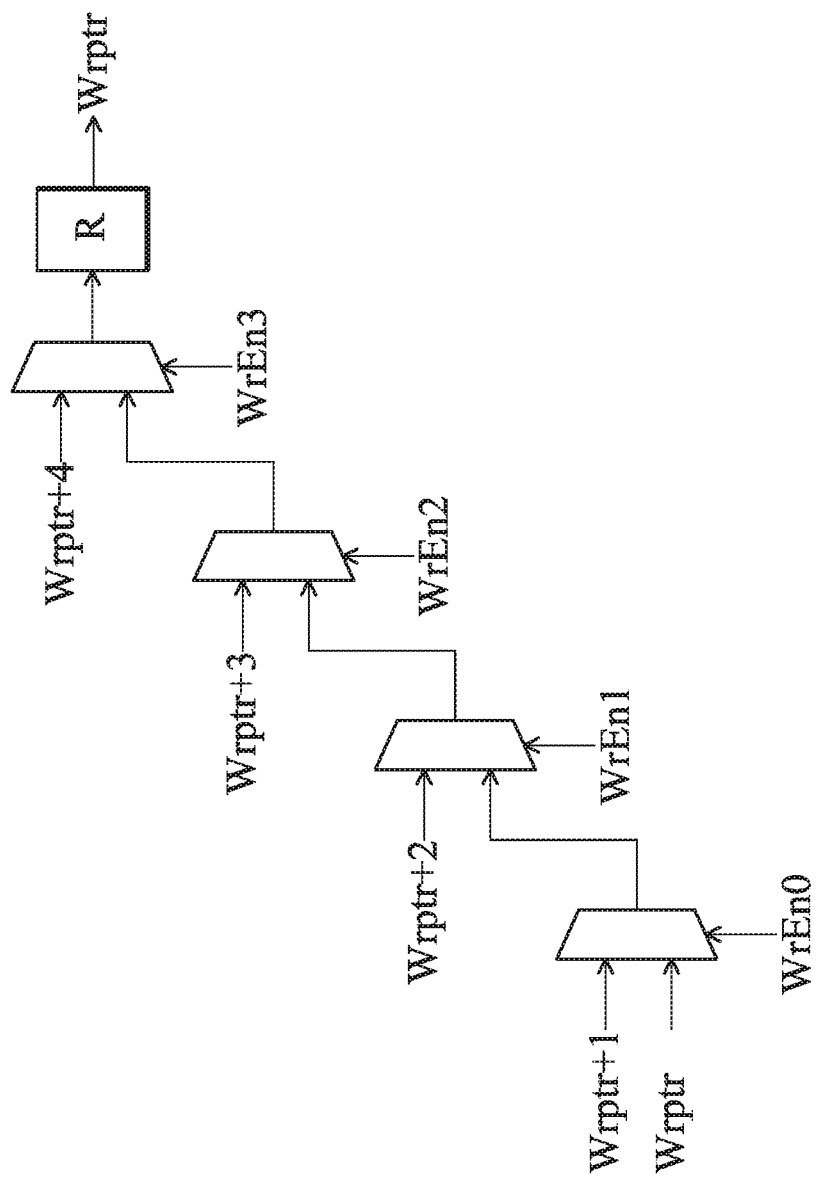
FIG. 6 illustrates the logic circuit for setting the write pointer Wrptr in accordance with an exemplary embodiment of the present invention.

FIG. 6 illustrates the logic circuit for setting the write pointer Wrptr in accordance with an exemplary embodiment of the present invention, which includes four multiplexers connected in series and the four multiplexers are controlled by the four write enable signals WrEn0 . . . WrEn3. According to the number of instruction addresses pushed into the fetch-target queue FTQ in the current cycle (related to the status of the write enable signals WrEn0 . . . WrEn3), the write pointer position in the next cycle (kept at Wrptr, or increment by 1 to Wrptr+1, or incremented by 2 to Wrptr+2, or incremented by 3 to Wrptr+3, or incremented by 4 to Wrptr+4) is set by the circuit. The updated write pointer is buffered in the register R and then used as the write pointer Wrptr in the next cycle. The circuit in FIG. 6 may be designed in the control circuit of the fetch-target queue FTQ. For example, the write pointer Wrptr depicted in FIG. 2 may be set by such a circuit. The write enable signals WrEn0 . . . WrEn3 may be set by the branch predictor 110.

The four multiplexers in FIG. 6 can be extended to other numbers, such as N, where N is a positive integer greater than 1. The branch predictor 110 performs branch prediction on N instruction addresses in parallel in each cycle. Among the N instruction addresses with the branch prediction finished, the instruction addresses in the predicted direction without overlapping the instruction addresses processed in the previous cycle should be pushed into the fetch-target queues FTQ. The N multiplexers connected in series are controlled by N write enable signals WrEn0 . . . WrEn(N−1). When no write enable signal is asserted, the current value of the write pointer Wrptr is transferred through the N multiplexers. When the first m write enable signals WrEn0 . . . WrEn(m−1) are asserted (m is an integer greater than 0), the current value of the write pointer Wrptr is incremented by m (=Wrptr+m) and output from the final multiplexer. The register R buffers the output from the final multiplexer. In the next cycle, the write pointer Wrptr operating the fetch-target queue FTQ is updated by the buffered value. The N write enable signals WrEn0 . . . WrEn(N−1) are set by the branch predictor 110 and depends on the number of instruction addresses pushed into fetch-target queue FTQ in the current cycle.

The following discusses the detailed response method of the instruction cache 104 instruction fetch failure.

In addition to the aforementioned cache missing situation, there are many other factors to fail the instruction fetching of the instruction cache 104. When accessing the instruction cache 104, a virtual address must be converted into a physical cache address. This address mapping is generally stored in a translation lookaside buffer tlb. If the translation lookaside buffer tlb is not ready (tlb miss), the instruction fetching of the instruction cache 104 may fail. In another situation, the instruction 102 fetched from the instruction cache 104 needs to be buffered to be decoded, but the buffer (such as an xib queue) of the decoder 106 may be full (xib full), and the fetched instruction 102 can only be discarded, which is also regarded as an instruction fetching failure of the instruction cache 104. The instruction fetching failure is usually determined in the U-stage pipeline of the instruction cache 104. Using the fetch-target queue FTQ to backup the instruction-fetching address AddrL1i is proposed in the present invention. In response to the instruction fetching failure of the instruction cache 104, the read pointer Rdptr of the fetch-target queue FTQ is modified, so that the failed instruction address is read out from the fetch-target queue FTQ again to be processed by the C-stage pipeline of the instruction cache 104. Since the backup of the instruction-fetching address AddrL1i is provided by the fetch-target queue FTQ, an additional space for the backup of the failed instruction-fetching address AddrL1i is not required. There is no need for complex signal traces and logic circuits which are conventionally implemented by 48-bit comparators or multiplexers.

In an exemplary embodiment, the read pointer Rdptr for reading the fetch-target queue FTQ to output an instruction-fetching address AddrL1i to the C-stage pipeline of the instruction cache 104 is the recorded as a backup pointer. The backup pointer will be kept all the way until the instruction cache 104 completes the U-stage pipeline calculations of the instruction-fetching address AddrL1i. When it is determined in the U-stage pipeline of the instruction cache 104 that the instruction fetching related to the instruction-fetching address AddrL1i fails, the read pointer Rdptr of the fetch-target queue FTQ is restored to the backup pointer. According to the restored read pointer Rdptr, the same instruction-fetching address AddrL1i is read out from the fetch-target queue FTQ and sent to the C-stage pipeline of the instruction cache 104 again.

Figure 7:
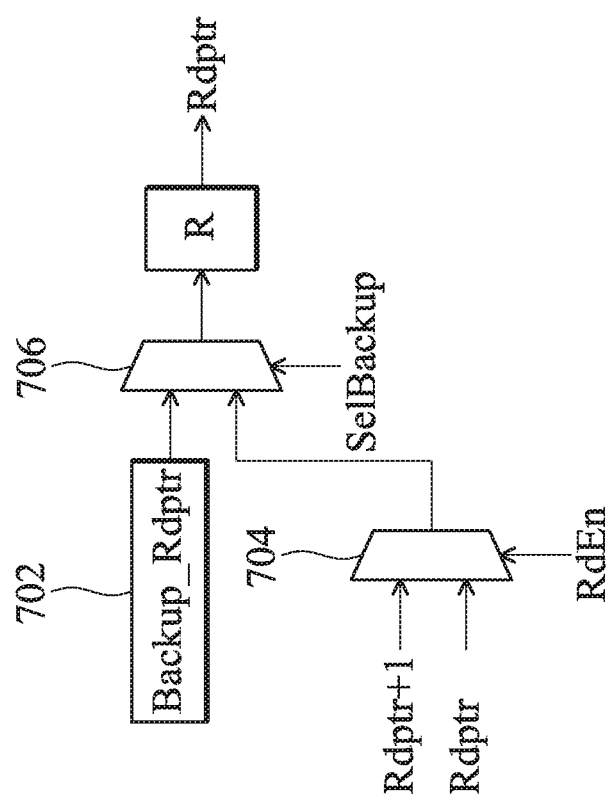
FIG. 7 depicts a logic circuit for setting the read pointer Rdptr.

FIG. 7 depicts a logic circuit for setting the read pointer Rdptr. A backup pointer Backup_Rdptr is stored in a buffer 702. As enabled by a read enable signal RdEn issued by the instruction cache 104, the fetch-target queue FTQ is requested to output an instruction-fetching address AddrL1i and the read pointer Rdptr has to be updated each cycle. As shown, the incremental read pointer Rdptr+1 can be transferred through the multiplexer 704. The multiplexer 706 is provided to provide an option to restore the read pointer Rdptr. When determining instruction-fetching failure in the U-stage pipeline calculations, the instruction cache 104 asserts a selection signal SelBackup, so that the backup pointer Backup_Rdptr is transferred through the multiplexer 706 and buffered in the buffer R, to be used as the read pointer Rdptr in the next cycle. The circuit in FIG. 7 may be designed in the control circuit of the fetch-target queue FTQ. For example, the read pointer Rdptr depicted in FIG. 2 may be set by such a circuit. The read enable signal RdEn may be controlled by the instruction cache 104.

Figure 8A:
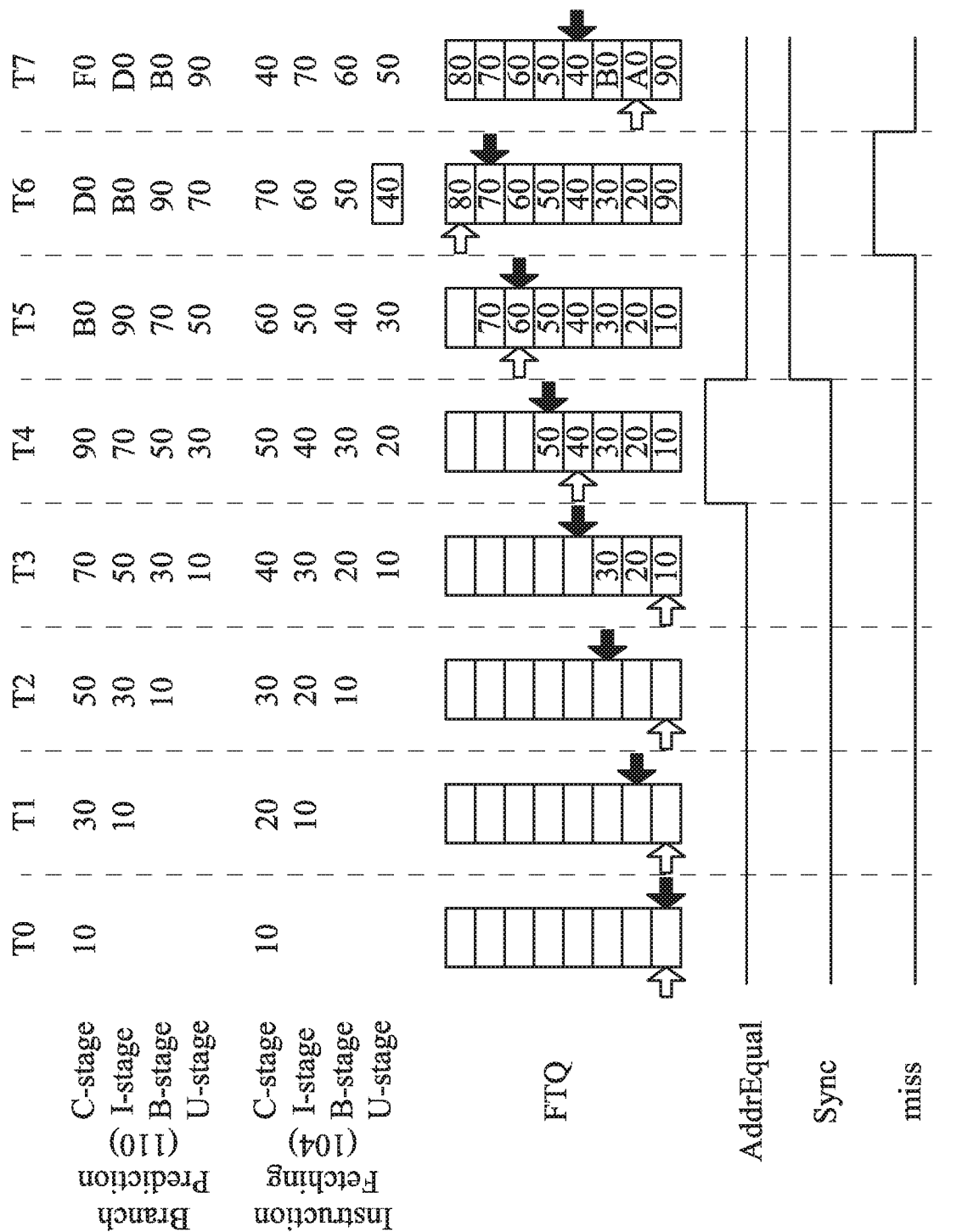
FIG. 8A shows an example of instruction fetching failure in the synchronous mode.

FIG. 8A shows an example of instruction fetching failure in the synchronous mode. Unlike the example illustrated in FIG. 5A, FIG. 8A shows that in cycle T6 the U-stage pipeline of the instruction cache 104 determines that the instruction fetching of the chunk indicated by the instruction address 40 fails, and a miss signal is asserted. In cycle T6, the instruction cache 104 and the fetch-target queue FTQ are already synchronized (i.e., Sync is high). The instruction fetching failure occurs in the synchronous mode. In cycle T7, the read pointer Rdptr of the fetch-target queue FTQ needs to be restored to the backup pointer prepared for the instruction address 40. The backup pointer for the instruction address 40 is set in cycle T3, corresponding to the instruction fetching address 40 received by the C-stage pipeline of the instruction cache 104. The backup pointer points to the fourth entry of the fetch-target queue FTQ. As shown, in cycle T7, the read pointer Rdptr is corrected by the backup pointer and thereby points to the fourth entry of the fetch-target queue FTQ. In cycle T7, the instruction-fetching address 40 is read from the fetch-target queue FTQ again according to the restored read pointer Rdptr, and is sent to the C-stage pipeline of the instruction cache 104. The instruction cache 104 and fetch-target queue FTQ are still synchronized (i.e., Sync is kept high).

Figure 8B:
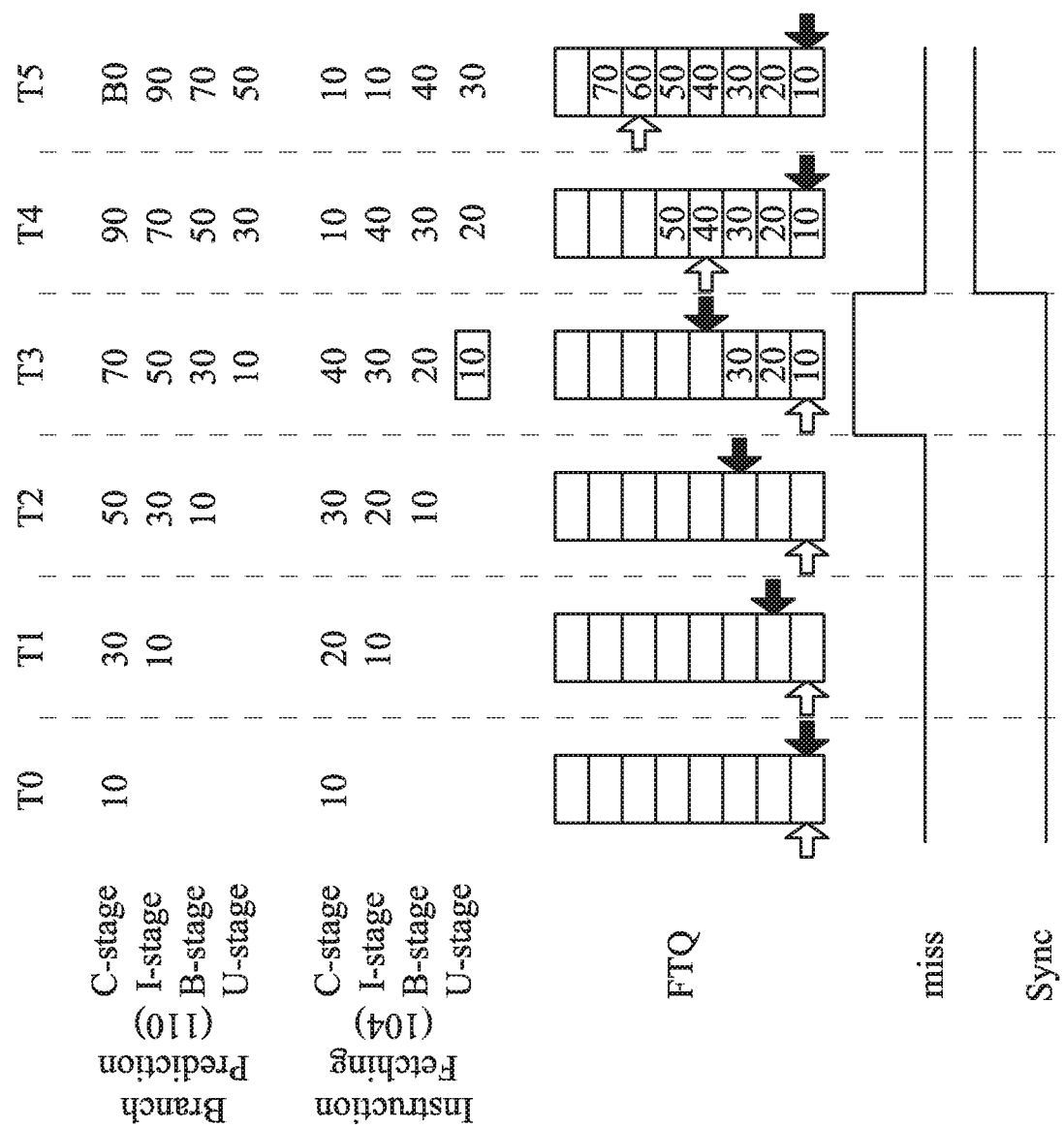
FIG. 8B shows an example of instruction fetching failure in the asynchronous mode.

FIG. 8B shows an example of instruction fetching failure in the asynchronous mode. Unlike the example illustrated in FIG. 5A, FIG. 8B shows that in cycle T3 the U-stage pipeline of the instruction cache 104 determines that the instruction fetching of the chunk indicated by the instruction address 10 fails, and a miss signal is asserted. In cycle T3, the instruction cache 104 and the fetch-target queue FTQ are asynchronous (i.e., Sync is low). The instruction fetching failure occurs in the asynchronous mode. In cycle T4, the read pointer Rdptr of the fetch-target queue FTQ needs to be restored to the backup pointer prepared for the instruction address 10. The backup pointer for the instruction address 10 is set in cycle T0, corresponding to the instruction fetching address 10 received by the C-stage pipeline of the instruction cache 104. The backup pointer points to the first entry of the fetch-target queue FTQ. As shown, in cycle T4, the read pointer Rdptr is corrected by the backup pointer and thereby points to the first entry of the fetch-target queue FTQ, and the instruction cache 104 and the fetch-target queue FTQ are synchronized (i.e., Sync is high). The instruction-fetching address 10 is read from the fetch-target queue FTQ again according to the restored read pointer Rdptr, and is sent to the C-stage pipeline of the instruction cache 104. In cycle T5, the instruction cache 104, however, is not ready yet. The read pointer Rdptr is kept to point to the first entry of the fetch-target queue FTQ. The fetch-target queue FTQ outputs the instruction address 10 again to the C-stage pipeline of the instruction cache 104. In another design, the Sync is kept low and the instruction cache 104 and the fetch-target queue FTQ are not synchronized until cycle T5.

As mentioned above, backup of the content stored in the fetch-target queue FTQ is required to cope with the failure of the instruction cache 104. Therefore, the content in the fetch-target queue FTQ cannot be deleted although the content has been sent to the instruction cache 104. Instead, the content in the fetch-target queue FTQ has to be kept until the related instruction fetching is successful. In an exemplary embodiment, each entry of the fetch-target queue FTQ is flagged by two valid flags (registers): a C-stage valid flag; and a U-stage valid flag.

As a target instruction address is written into a target entry, the C-stage valid flag and U-stage valid flag of the target entry are both asserted. When the target instruction fetching address is processed by the C-stage pipeline of the instruction cache 104 (no matter in synchronous or asynchronous mode), the C-stage valid flag of the target entry is deasserted. The U-stage of the target entry is kept asserted until the U-stage pipeline of the instruction cache 104 successfully completes the instruction fetching of the chunk indicated by the target instruction address.

When the C-stage valid flags of all entries of the fetch-target queue FTQ are deasserted, it means that no instruction address can be read out from the fetch-target queue FTQ to the C-stage pipeline of the instruction cache 104 as the instruction-fetching address AddrL1i. At this time, the fetch-target queue FTQ stops transferring any instruction address to the instruction cache 104 the instruction, to prevent from transferring invalid instruction addresses to the instruction cache 104 as the instruction-fetching address AddrL1i.

When the U-stage valid flags of all entries of the fetch-target queue FTQ are asserted, it means that the fetch-target queue FTQ is full, and there is no space to buffer more instruction addresses transferred from the branch predictor 110. At this time, the branch predictor 110 is prohibited from pushing any instruction address into the fetch-target queue FTQ. The instruction addresses stored in the fetch-target queue FTQ as backup for the restore of the failed instruction-fetching address, therefore, are protected from being overwritten by the new instruction addresses transferred from the branch predictor 110.

Furthermore, a C-stage valid flag is re-asserted (e.g., to the same state of the U-stage valid flag) when the related instruction fetching fails.

Figure 9A:
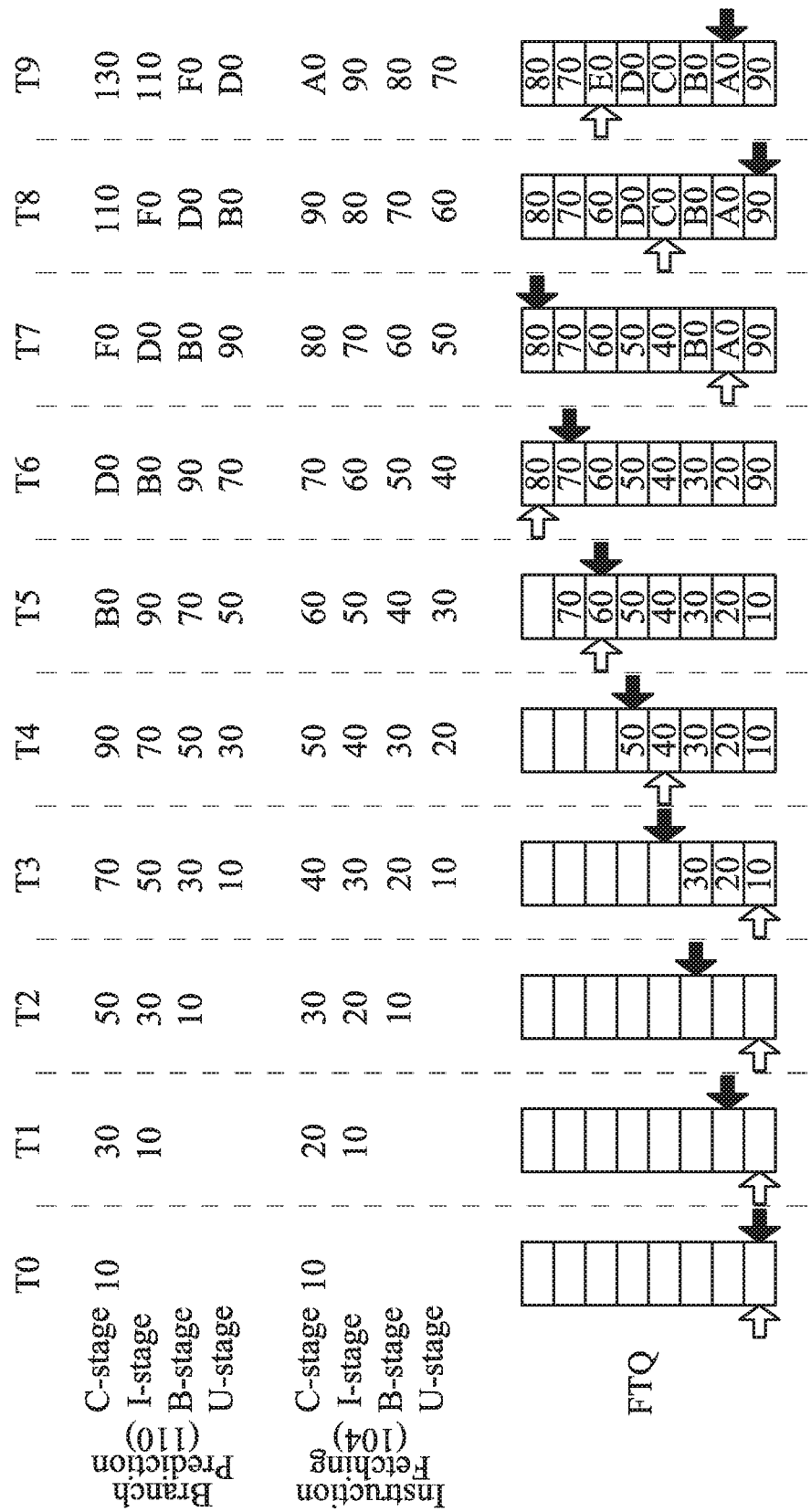
FIGS. 9A and 9B illustrate how the C-stage and U-stage valid flags of the different entries are changed in accordance with an exemplary embodiment of the present invention.
Figure 9B:
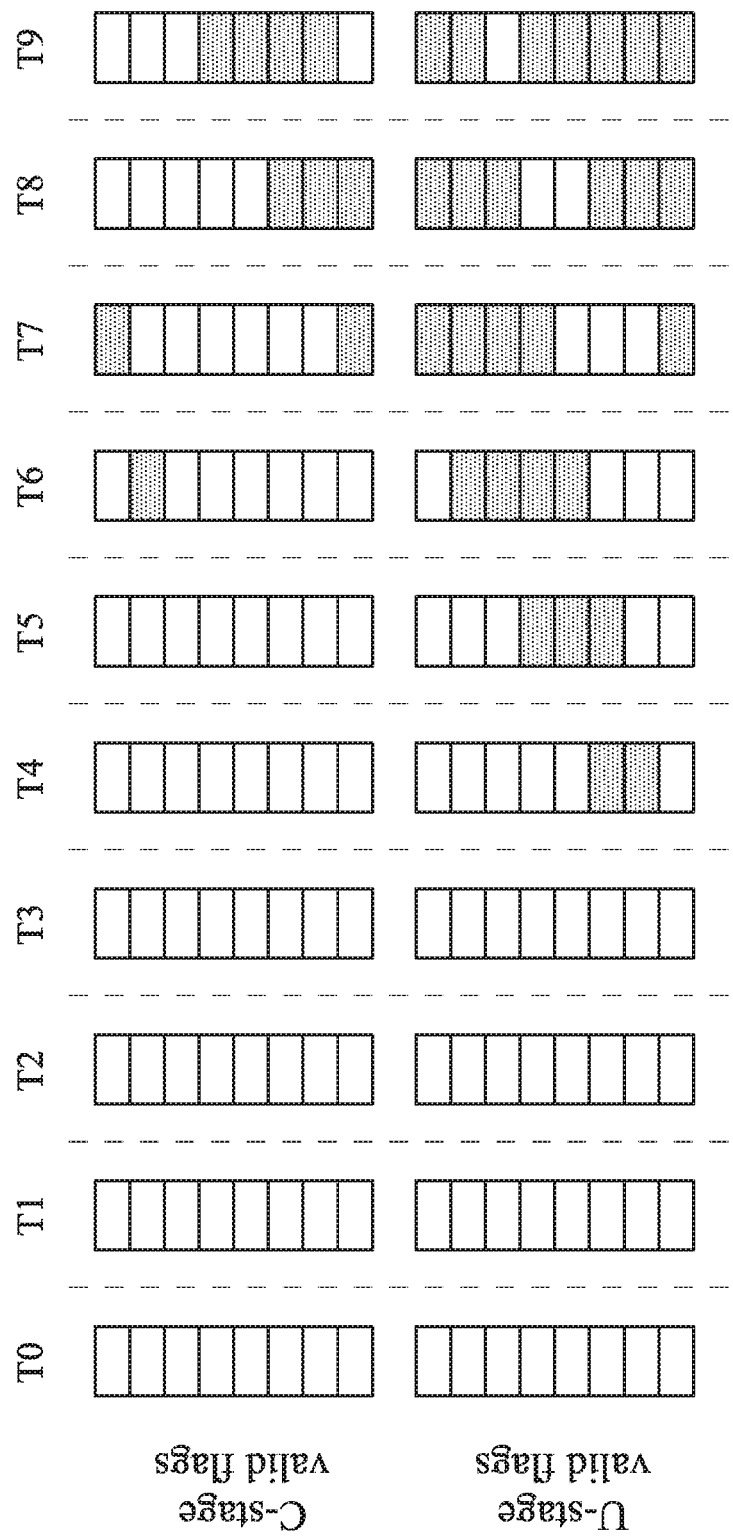

FIGS. 9A and 9B illustrate how the C-stage and U-stage valid flags of the different entries are changed in accordance with an exemplary embodiment of the present invention. Compared to FIG. 5A, FIG. 9A extends to cycles T8 and T9 to further show the full status of the fetch-target queue FTQ. Corresponding to FIG. 9A, FIG. 9B shows the changes in the C-stage and U-stage valid flags. The upper row shows the changes of the C-stage valid flags of the different entries of the fetch-target queue FTQ, and the lower row shows the changes of the U-stage valid flags of the different entries of the fetch-target queue FTQ. Each C-stage/U-stage valid flag depends on the status of the fetch-target queue FTQ in the previous cycle, and is used in the control of the fetch-target queue FTQ in the CURRENT cycle.

In cycle T3, the instruction addresses 10, 20, and 30 are written into the first, second, and third entries of the fetch-target queue FTQ, but these instruction addresses 10, 20, and 30 are dropped behind by the instruction cache 104 which is processing the instruction address 40 in the C-stage pipeline. Moreover, the instruction fetching of the instruction address 10 is finished by the U-stage pipeline of the instruction cache 104 in cycle T3. Thus, in cycle T4, the C-stage valid flags of the first, second and third entries are kept low while the U-stage valid flags of the second and third entries are asserted. According to the asserted U-stage valid flags of the second and third entries, the write pointer Wrptr is pointed to the fourth entry as shown in cycle T4 of FIG. 9A, and it is determined that the fifth entry is empty. In cycle T4, the instruction addresses 40 and 50 with finished branch prediction and non-overlapping the instruction addresses processed in the previous cycle are written into the fourth and fifth entries of the fetch-target queue FTQ.

In cycle T4, the instruction addresses 40 and 50 written into the fourth and fifth entries of the fetch-target queue FTQ have been sent to the instruction cache 104 for processing (as shown, the instruction cache 104 is processing the instruction address 50 in the C-stage pipeline), and the instruction fetching of the instruction address 20 backup in the second entry of the fetch-target queue FTQ is finished by the U-stage pipeline of the instruction cache 104. Thus, in cycle T5, the C-stage valid flags of the fourth and fifth entries are kept low, the U-stage valid flags of the fourth and fifth entries are asserted, and the U-stage valid flag of the second entry is deasserted. According to the asserted U-stage valid flags, the write pointer Wrptr is pointed to the sixth entry as shown in cycle T5 of FIG. 9A, and it is determined that the seventh entry is empty. In cycle T5, the instruction addresses 60 and 70 with finished branch prediction and non-overlapping the instruction addresses processed in the previous cycle are written into the sixth and seventh entries of the fetch-target queue FTQ.

In cycle T5, the instruction addresses 60 and 70 are written into the sixth and seventh entries of the fetch-target queue FTQ in parallel but only the instruction address 60 has been sent to the instruction cache 104 for processing (as shown, the instruction cache 104 is processing the instruction address 60 in the C-stage pipeline). Furthermore, the instruction fetching of the instruction address 30 backup in the third entry of the fetch-target queue FTQ is finished by the U-stage pipeline of the instruction cache 104 in cycle T5. Thus, in cycle T6, the C-stage valid flag of the sixth entry is kept low, the C-stage valid flag of the seventh entry is asserted, the U-stage valid flags of the sixth and seventh entries are asserted, and the U-stage valid flag of the third entry is deasserted. According to the asserted U-stage valid flags, the write pointer Wrptr is pointed to the eighth entry as shown in cycle T6 of FIG. 9A, and it is determined that the first entry is empty. In cycle T6, the instruction addresses 80 and 90 with finished branch prediction and non-overlapping the instruction addresses processed in the previous cycle are written into the eighth and first entries of the fetch-target queue FTQ.

In cycle T6, the instruction address 70 in the seventh entry is read out and sent to the C-stage pipeline of the instruction cache 104, the instruction addresses 80 and 90 written into the eighth and first entries of the fetch-target queue FTQ are waiting to be read for instruction fetching, and the instruction fetching of the instruction address 40 backup in the fourth entry of the fetch-target queue FTQ is finished by the U-stage pipeline of the instruction cache 104. Thus, in cycle T7, the C-stage valid flag of the seventh entry is deasserted, the C-stage valid flags and the U-stage valid flags of the eighth and first entries are asserted, and the U-stage valid flag of the fourth entries is deasserted. According to the asserted U-stage valid flags, the write pointer Wrptr is pointed to the second entry as shown in cycle T7 of FIG. 9A, and it is determined that the third entry is empty. In cycle T7, the instruction addresses A0 and B0 with finished branch prediction and non-overlapping the instruction addresses processed in the previous cycle are written into the second and third entries of the fetch-target queue FTQ.

In cycle T7, the instruction address 80 in the eighth entry is read out and sent to the C-stage pipeline of the instruction cache 104, the instruction addresses A0 and B0 written into the second and third entries of the fetch-target queue FTQ are waiting to be read for instruction fetching, and the instruction fetching of the instruction address 50 backup in the fifth entry of the fetch-target queue FTQ is finished by the U-stage pipeline of the instruction cache 104. Thus, in cycle T8, the C-stage valid flag of the eighth entry is deasserted, the C-stage valid flags and the U-stage valid flags of the second and third entries are asserted, and the U-stage valid flag of the fifth entries is deasserted. According to the asserted U-stage valid flags, the write pointer Wrptr is pointed to the fourth entry as shown in cycle T8 of FIG. 9A, and it is determined that the fifth entry is empty. In cycle T8, the instruction addresses C0 and D0 with finished branch prediction and non-overlapping the instruction addresses processed in the previous cycle are written into the fourth and fifth entries of the fetch-target queue FTQ.

In cycle T8, the instruction address 90 in the first entry is read out and sent to the C-stage pipeline of the instruction cache 104, the instruction addresses C0 and D0 written into the fourth and fifth entries of the fetch-target queue FTQ are waiting to be read for instruction fetching, and the instruction fetching of the instruction address 60 backup in the sixth entry of the fetch-target queue FTQ is finished by the U-stage pipeline of the instruction cache 104. Thus, in cycle T9, the C-stage valid flag of the first entry is deasserted, the C-stage valid flags and the U-stage valid flags of the fourth and fifth entries are asserted, and the U-stage valid flag of the sixth entries is deasserted. According to the asserted U-stage valid flags, the write pointer Wrptr is pointed to the sixth entry as shown in cycle T9 of FIG. 9A, and it is determined that the seventh entry has not been released. In cycle T9, the instruction addresses E0 and F0 with finished branch prediction and non-overlapping the instruction addresses processed in the previous cycle are not both pushed into the fetch-target queue FTQ. Only the instruction address E0 is pushed into the fetch-target queue FTQ and stored in the sixth entry of the fetch-target queue FTQ. The seventh entry storing backup of the instruction address 70 is well protected.

In the forgoing exemplary embodiments, when no taken branch is predicted nor instruction fetching failure occurs, the read pointer Rdptr of the fetch-target queue FTQ is incremented cycle by cycle by default, and is recorded in each cycle as the backup pointer Backup_Rdptr for the instruction-fetching address AddrL1i sent to the C-stage pipeline of the instruction cache 104. In response to the instruction-fetching failure occurring in the U-stage pipeline calculations of the instruction cache 104, the read pointer Rdptr is restored by the backup pointer Backup_Rdptr related to the failed instruction-fetching address. The failed instruction-fetching address is read out from the fetch-target queue FTQ again according to the backup pointer Backup_Rdptr, and is sent to the instruction cache 104 to repeat the instruction fetching. The circuit design is simple and economical. The aforementioned C-stage valid flags and U-stage valid flags protect the backup instruction addresses from being overwritten too early.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A microprocessor, comprising:
an instruction cache, operated according to an instruction-fetching address for instruction fetching;
a branch predictor;
a fetch-target queue coupled between the branch predictor and the instruction cache;

a decoder, receiving and decoding an instruction fetched from the instruction cache; and an execution unit, coupled to the decoder to execute the decoded instruction;

wherein:

from the branch predictor, the fetch-target queue receives and stores instruction addresses with finished branch prediction, to be read out later as the instruction-fetching address at different times for the instruction cache;

when the decoder or the execution unit triggers a flushing event, a flushing address is fed to the instruction cache as the instruction-fetching address, the fetch-target queue is cleared, the branch predictor is switched to perform branch prediction for the flushing address;

the microprocessor generates fetching-purpose self-increased addresses incremented from the flushing address cycle by cycle, and the generated fetching-purpose self-increased addresses are fed to the instruction cache as the instruction-fetching address at different times;

when any of instruction addresses pushed into the fetch-target queue is equal to a fetching-purpose self-increased address generated in the same cycle, the instruction cache is switched to get the instruction-fetching address from the fetch-target queue.

2. The microprocessor as claimed in claim 1, wherein:

during the same cycle, the branch predictor performs branch prediction in parallel for a plurality of instruction addresses; and instruction addresses pushed into the fetch-target queue by the branch predictor in a current cycle do not overlap previously-predicted instruction addresses which have been pushed into the fetch-target queue in a previous cycle.

3. The microprocessor as claimed in claim 1, generating prediction-purpose self-increased addresses incremented from the flushing address cycle by cycle to be processed by the branch predictor for branch prediction.

4. The microprocessor as claimed in claim 1, wherein:

the fetch-target queue is operated according to a starting write pointer and a read pointer;

in response to the flushing address fed to the instruction cache, the starting write pointer and the read pointer are both reset to point to a starting entry of the fetch-target queue;

the read pointer moves to the next entry each cycle;

in response to instruction addresses pushed into the fetch-target queue in the current cycle, the starting write pointer is revised to point to a first entry that is allocated to store a first instruction address among the instruction addresses pushed into the fetch-target queue in the current cycle;

instruction addresses are pushed into the fetch-target queue in parallel by the branch predictor and indicated by parallel write pointers, and the parallel write pointers include the starting write pointer and self-increased write pointers incremented from the starting write pointer; and when the read pointer is equal to any of the parallel write pointers, the instruction cache is switched to receive the instruction-fetching address from the fetch-target queue.

5. The microprocessor as claimed in claim 4, wherein:

when the read pointer is equal to any of the parallel write pointers in a first cycle, the instruction cache is switched to receive the instruction-fetching address from the fetch-target queue in a second cycle next to the first cycle.

6. The microprocessor as claimed in claim 1, further comprising:

a multiplexer, receiving instruction addresses that are read out from the fetch-target queue, the fetching-purpose self-increased addresses, and the flushing address, to provide the instruction cache with the instruction-fetching address.

7. The microprocessor as claimed in claim 1, wherein:

when the branch predictor predicts that a branch will be taken and predicts a branch target address of the taken branch, instruction addresses with finished branch prediction but bypassed by the taken branch are not pushed into the fetch-target queue.

8. The microprocessor as claimed in claim 1, wherein:

when the branch predictor predicts that a branch will be taken and predicts the branch target address of the taken branch, the branch predictor is switched to perform branch prediction for the branch target address.

9. The microprocessor as claimed in claim 8, wherein:

prediction-purpose self-increased addresses incremented from the branch target address are generated cycle by cycle and processed by the branch predictor for branch prediction.

10. The microprocessor as claimed in claim 1, wherein:

when the branch predictor predicts that a branch will be taken and predicts a branch target address of the taken branch, and the fetch-target queue no longer outputs any instruction address, the branch target address is fed to the instruction cache as the instruction-fetching address.

11. The microprocessor as claimed in claim 10, wherein:

fetching-purpose self-increased addresses incremented from the branch target address are generated cycle by cycle to be fed to the instruction cache as the instruction-fetching address.

12. The microprocessor as claimed in claim 11, wherein:

the fetch-target queue is operated according to a starting write pointer and a read pointer;

in response to instruction addresses pushed into the fetch-target queue in the current cycle, the starting write pointer is revised to point to a first entry that is allocated to store a first instruction address among the instruction addresses pushed into the fetch-target queue in the current cycle;

when the branch target address is predicted, the starting write pointer and the read pointer are both corrected to point to a first blank entry;

the read pointer moves to the next entry each cycle;

instruction addresses are pushed into the fetch-target queue in parallel by the branch predictor and indicated by parallel write pointers, and the parallel write pointers include the starting write pointer and self-increased write pointers incremented from the starting write pointer; and when the read pointer is equal to any of the parallel write pointers, the instruction cache is switched to receive the instruction-fetching address from the fetch-target queue.

13. The microprocessor as claimed in claim 12, wherein:

when the read pointer is equal to any of the parallel write pointers in the first cycle, the instruction cache is switched to receive the instruction-fetching address from the fetch-target queue in the second cycle next to the first cycle.

14. The microprocessor as claimed in claim 11, wherein:
during the same cycle, the branch predictor performs branch prediction in parallel for a plurality of instruction addresses.

15. The microprocessor as claimed in claim 11, further comprising:
a multiplexer, receiving the instruction addresses that read out from the fetch-target queue, the fetching-purpose self-increased addresses, and the branch target address, to provide the instruction cache with the instruction-fetching address.

* * * * *